United States Patent
Fujiie et al.

(10) Patent No.: US 12,199,549 B2
(45) Date of Patent: Jan. 14, 2025

(54) SOLAR BATTERY MODULE INSTALLATION STRUCTURE AND DWELLING

(71) Applicants: SEKISUI HOUSE, LTD., Osaka (JP); KANEKA CORPORATION, Osaka (JP)

(72) Inventors: Mitsuro Fujiie, Osaka (JP); Hiroshi Onomura, Osaka (JP); Naotaka Tani, Osaka (JP); Takahiro Kokubo, Osaka (JP); Hideki Oe, Osaka (JP)

(73) Assignees: SEKISUI HOUSE, LTD., Osaka (JP); KANEKA CORPORATION, Japan Osaka (JP)

( * ) Notice: Subject to any disclaimer, the term of this patent is extended or adjusted under 35 U.S.C. 154(b) by 247 days.

(21) Appl. No.: 17/995,689

(22) PCT Filed: Apr. 2, 2021

(86) PCT No.: PCT/JP2021/014284
§ 371 (c)(1),
(2) Date: Oct. 6, 2022

(87) PCT Pub. No.: WO2021/206008
PCT Pub. Date: Oct. 14, 2021

(65) Prior Publication Data
US 2023/0133666 A1    May 4, 2023

(30) Foreign Application Priority Data
Apr. 8, 2020 (JP) .................. 2020-069684

(51) Int. Cl.
*H02S 20/22* (2014.01)
*E04F 13/08* (2006.01)
*H02S 40/34* (2014.01)

(52) U.S. Cl.
CPC .......... *H02S 20/22* (2014.12); *E04F 13/0816* (2013.01); *E04F 13/083* (2013.01); *H02S 40/34* (2014.12)

(58) Field of Classification Search
CPC ...... H02S 20/22; H02S 40/34; E04F 13/0816; E04F 13/083
(Continued)

(56) References Cited

U.S. PATENT DOCUMENTS 6,111,189 A * 8/2000 Garvison ................ H02S 40/36
126/621
8,938,919 B2 * 1/2015 Cinnamon .......... H01L 31/0201
52/173.3

(Continued)

FOREIGN PATENT DOCUMENTS

JP    H06-69527 A    3/1994
JP    2001-168370 A  6/2001
(Continued)

OTHER PUBLICATIONS

Machine translation of JP 2001168370 A, 2001.*
(Continued)

*Primary Examiner* — Paola Agudelo
(74) *Attorney, Agent, or Firm* — Studebaker & Brackett PC

(57) ABSTRACT

The present invention provides a solar cell module installation structure and a house that can reduce manufacturing cost and have good workability as compared with the related art.
A support member includes a rail part that extends substantially in a vertical direction and is longer than a length of the solar cell module. The solar cell module includes: a solar cell panel; and a frame member. The solar cell panel includes: a main body panel; a terminal box provided on a back surface
(Continued)

of the main body panel; and a wiring part extending from the terminal box. The frame member includes: a holding recess; and a mounting part. The holding recess sandwiches a part of the main body panel and is in contact with a light receiving surface and the back surface of the main body panel. The mounting part is provided on a back surface of the main body panel and is attached to the rail part of the support member. The mounting part has a penetration part that passes through from an inside to an outside with reference to the terminal box when the light receiving surface is viewed from front. The wiring part passes through the penetration part.

8 Claims, 20 Drawing Sheets

(58) Field of Classification Search
USPC ............................................. 52/173.3
See application file for complete search history.

(56) References Cited

U.S. PATENT DOCUMENTS

| | | | |
|---|---|---|---|
| 11,245,356 B1* | 2/2022 | Hsueh | H02S 30/00 |
| 11,649,986 B2* | 5/2023 | Powers, III | F24S 25/634 |
| | | | 52/173.3 |
| 2003/0126818 A1* | 7/2003 | Chung | E04F 13/083 |
| | | | 52/481.2 |
| 2011/0146763 A1* | 6/2011 | Sagayama | F24S 25/636 |
| | | | 403/219 |
| 2011/0162290 A1* | 7/2011 | Nightingale | H02S 40/34 |
| | | | 52/27 |
| 2011/0284058 A1* | 11/2011 | Cinnamon | F24S 25/67 |
| | | | 136/251 |
| 2013/0102165 A1* | 4/2013 | DuPont | H02S 20/22 |
| | | | 439/95 |
| 2015/0222226 A1* | 8/2015 | Giles | F24S 25/50 |
| | | | 29/525.01 |
| 2018/0094431 A1* | 4/2018 | Koziol | E04F 13/081 |
| 2020/0009613 A1* | 1/2020 | Swanson | H02S 40/22 |
| 2020/0080317 A1* | 3/2020 | Girnghuber | E04F 13/0819 |
| 2020/0385993 A1* | 12/2020 | McDonald | H02S 20/23 |
| 2022/0290442 A1* | 9/2022 | Bilge | E04F 13/0807 |

FOREIGN PATENT DOCUMENTS

| | | |
|---|---|---|
| JP | 2010-275808 A | 12/2010 |
| JP | 2012-184606 A | 9/2012 |
| JP | 2016-089353 A | 5/2016 |
| JP | 2017-011953 A | 1/2017 |

OTHER PUBLICATIONS

International Search Report issued in PCT/JP2021/014284; mailed Jun. 22, 2021.
International Preliminary Report on Patentability and Written Opinion issued in PCT/JP2021/014284; issued Oct. 6, 2022.

* cited by examiner

SOLAR BATTERY MODULE INSTALLATION STRUCTURE AND DWELLING

TECHNICAL FIELD

The present invention relates to a solar cell module installation structure to be provided on a wall surface of a building, and relates to a house.

BACKGROUND ART

In recent years, due to promotion of renewable energy, it has been promoted that houses are made to be zero-energy houses (hereinafter, also referred to as ZEHs).

Typical examples of renewable energy include a solar power generation system using a solar cell module. Examples of a conventional solar power generation system include a solar cell module installed on a roof surface of a house.

However, when a solar cell module is installed only on a roof surface of a house as in a conventional manner, it is impossible to secure a sufficient light receiving area to make the house to be a ZEH in some cases.

To address this issue, in recent years, efforts have been made to a secure power-generation capacity as a whole by not only installing a solar cell module only on a roof surface of a house as in the conventional manner but also installing a solar cell module on a wall surface of the house (for example, Patent Document 1).

PRIOR ART DOCUMENTS

Patent Documents

Patent Document 1: JP 2010-275808 A
Patent Document 2: JP 2017-011953 A

DISCLOSURE OF INVENTION

Technical Problem

It can be considered that, when a solar cell module is installed on a wall surface of a building, a sense of unity of the solar cell module with the building can be provided by lowering the height from the wall surface of the building to a light receiving surface of the solar cell module, thereby achieving excellence in design.

On the other hand, when the height from the wall surface of the building to the light receiving surface of the solar cell module is lowered, the space between a back surface of the solar cell module and the wall surface of the building is narrowed, whereby a wiring space is extremely narrowed.

In some types of solar cell modules, frames are provided on the four sides of a solar cell panel, and mounting parts are provided on the frames to extend along the sides of the solar cell panel on the rear side of the solar cell panel (for example, Patent Document 2).

When the solar cell module as described in Patent Document 2 is attached to a wall surface of a building, a wiring line of the solar cell module is bypassed to the outer side of the end of a mounting part in the longitudinal direction so as to go around the mounting part, and is connected to another solar cell module. That is, in such a case, there is a problem that the connection between the solar cell modules is complex. Furthermore, in such a case, because the wiring line goes around the mounting part, it is necessary to increase the length of the wiring line; therefore, there is also a problem of increase in manufacturing cost.

Therefore, an object of the present invention is to provide a solar cell module installation structure and a house that can reduce manufacturing cost and have good workability as compared with the related art.

Solution to Problem

To solve the above problems, one aspect of the present invention is a solar cell module installation structure including: a solar cell module; and a support member that installs the solar cell module on a wall surface of a building, wherein the support member includes a rail part extending substantially in a vertical direction, the rail part having a vertical length longer than or equal to a vertical length of the solar cell module, wherein the solar cell module includes: a solar cell panel; and a frame member, the solar cell panel including: a main body panel; a terminal box provided on a back surface of the main body panel; and a wiring part extending from the terminal box, the frame member including: a holding recess; and a mounting part, the holding recess sandwiching a part of the main body panel, thereby being in contact with a light receiving surface and the back surface of the main body panel, wherein the mounting part is provided on a back surface side of the main body panel and is attached to the rail part, wherein the mounting part includes a penetration part that passes through from an inside to an outside of the mounting part with reference to the terminal box when the light receiving surface is viewed from front, and wherein the wiring part passes through the penetration part.

The term "building" here refers to a building such as a house, an office, a warehouse, a store, a factory, a school building, a lodging place, or a garage.

The term "substantially in a vertical direction" above includes not only a case of being completely vertical (a direction at 90 degrees with respect to a horizontal plane) but also a case of being negligibly inclined with respect to the vertical direction. Specifically, the "substantially in a vertical direction" includes a case of being inclined within a range of ±5 degrees with respect to the vertical direction.

According to this aspect, the wiring part passes through the penetration part of the mounting part; therefore, the wiring part can be directly connected to an external power source or another solar cell module without going around the mounting part. As a result, as compared with the case where the wiring part goes around the mounting part, the wiring part can be simply routed; therefore, the length of the wiring part can be shortened, and a construction time can be shortened. As a result, the manufacturing cost can be reduced and the workability at the time of manufacturing is improved as compared with the case where the wiring part goes around the mounting part.

In a preferred aspect, the penetration part is composed of a notch or a through hole.

With this aspect, the penetration part is easily formed, and the wiring part is easily positioned.

In a preferred aspect, the frame member includes: a holding frame having the holding recess; and a mounting frame having the mounting part.

According to this aspect, the holding recess and the mounting part are provided on separate members; therefore, it is possible to replace the holding frame and the mounting frame individually. Therefore, the maintenance cost can be reduced.

In a more preferred aspect, the support member includes a locking part, the mounting frame includes: a panel-side wall part and a support-side wall part facing each other at an interval on the back surface side of the main body panel; and a connection wall part connecting the panel-side wall part and the support-side wall part, the support-side wall part is engaged with the locking part, and the penetration part is arranged on the connection wall part.

With this aspect, the penetration part that allows the wiring part to pass therethrough is provided in the connection wall part. Therefore, the wiring part is allowed to pass through substantially at the shortest distance, and it is therefore possible to reduce production cost.

In a preferred aspect, the holding recess and the mounting part of the frame member are composed of a single member.

With this aspect, the number of components can be reduced, and workability can be improved as compared with the conventional art.

One aspect of the present invention is a solar cell module installation structure including: two solar cell modules provided side by side adjacent to each other; and a support member that installs the two solar cell modules on a wall surface of a building, wherein each of the two solar cell modules includes: a solar cell panel; and a frame member, the solar cell panel including: a main body panel; a terminal box provided on a back surface of the main body panel; and a wiring part extending from the terminal box, the frame member including: a holding recess; and a mounting part, the holding recess sandwiching a part of the main body panel, thereby being in contact with a light receiving surface and the back surface of the main body panel, wherein the mounting part is provided on a back surface side of the main body panel and is attached to the support member, wherein the mounting part includes a penetration part that passes through from an inside to an outside of the mounting part with reference to the terminal box when the light receiving surface is viewed from front, wherein the two solar cell modules include: a first and a second solar cell modules, wherein the wiring part of the first solar cell module passes through the penetration part of the first solar cell module and further passes through the penetration part of the second solar cell module, and wherein the wiring part of the first solar cell module is connected to the wiring part of the second solar cell module on the back surface side of the main body panel of the second solar cell module.

According to this aspect, the wiring part extending from the terminal box of the first solar cell module passes through the penetration part of the first solar cell module, further passes through the penetration part of the second solar cell module, and is connected to the wiring part extending from the terminal box of the second solar cell module on the back surface side of the second solar cell module. Therefore, the manufacturing cost can be reduced and the workability at the time of manufacturing is improved as compared with the case where the wiring part goes around the mounting part. In addition, the wiring part is not located between the first solar cell module and the second solar cell module; therefore, the interval between the first solar cell module and the second solar cell module can be narrowed, and the number of solar cell modules installed per unit area can be increased.

In a preferred aspect, the terminal box of the first solar cell module is off-centered toward a side of the second solar cell module in a direction in which the two solar cell modules are provided side by side, and the terminal box of the second solar cell module is off-centered toward a side of the first solar cell module in the direction in which the two solar cell modules are provided side by side.

With this aspect, the length of the wiring part connecting the terminal box of the first solar cell module and the terminal box of the second solar cell module can be shortened, and the manufacturing cost can be reduced.

One aspect of the present invention is a house including: a wall surface; and the above-described solar cell module installation structure, wherein the solar cell module installation structure is installed on the wall surface.

According to this aspect, the manufacturing cost can be reduced, and the workability is improved.

Effect of Invention

With a solar cell module installation structure and a house of the present invention, the manufacturing cost can be reduced, and the workability is improved.

BRIEF DESCRIPTION OF DRAWINGS

FIGS. 4A and 4B are explanatory views of the solar cell panel of FIG. 3, wherein FIG. 4A is a front view of the solar cell panel, and FIG. 4B is a rear view of the solar cell panel.

FIGS. 13A and 13B are explanatory views of a construction procedure of the solar cell module installation structure of FIG. 1, wherein FIG. 13A is a side view illustrating a state in which the solar cell module is inclined with respect to the wall surface, and FIG. 13B is a side view illustrating a state in which the solar cell module is made parallel to the wall surface.

BEST MODE FOR CARRYING OUT THE INVENTION

Hereinafter, embodiments of the present invention will be described in detail. In the following description, the installation posture of FIG. 1 is used as a reference unless otherwise specified.

Figure 1:
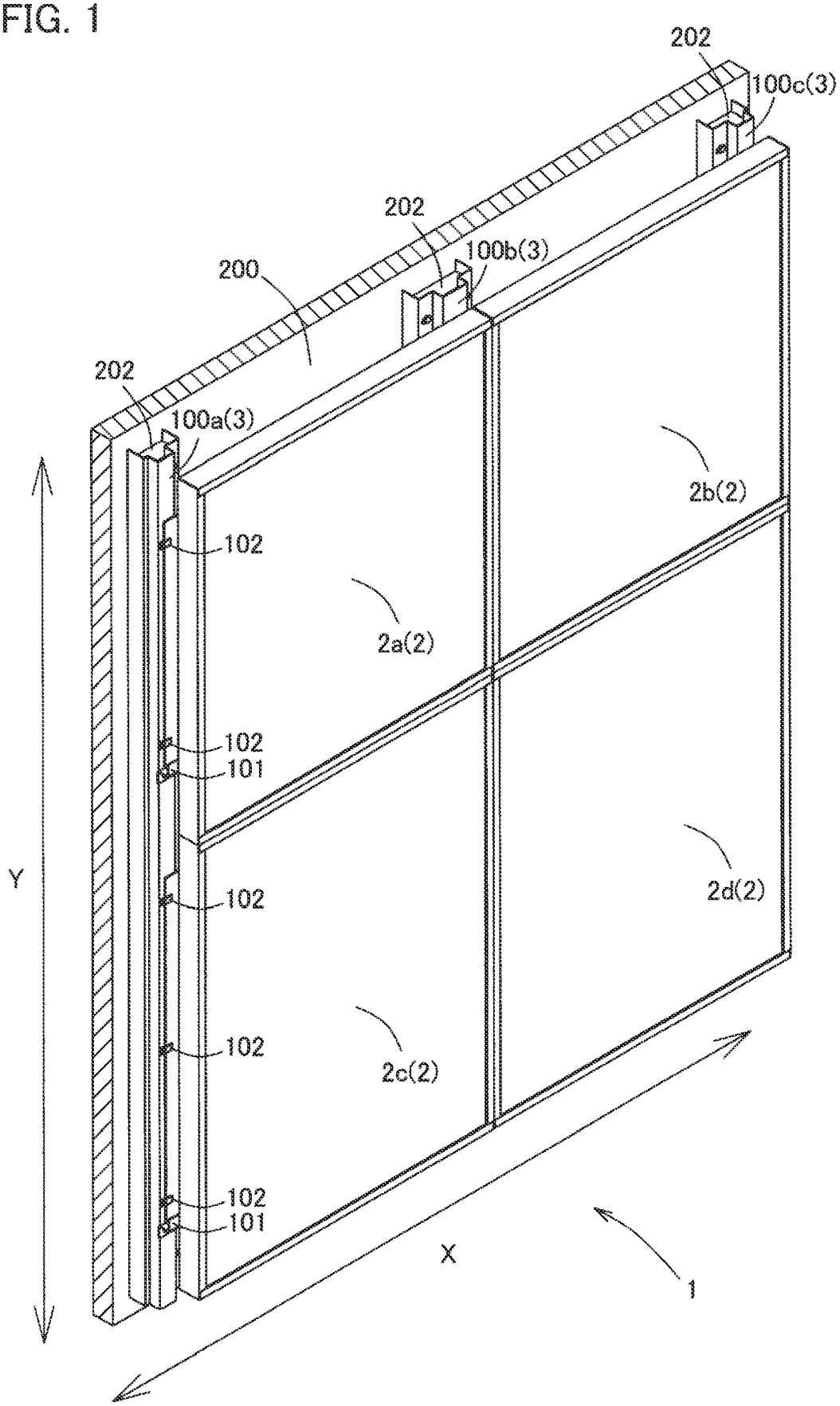
FIG. 1 is a perspective view schematically illustrating a solar cell module installation structure according to a first embodiment of the present invention.
Figure 2:
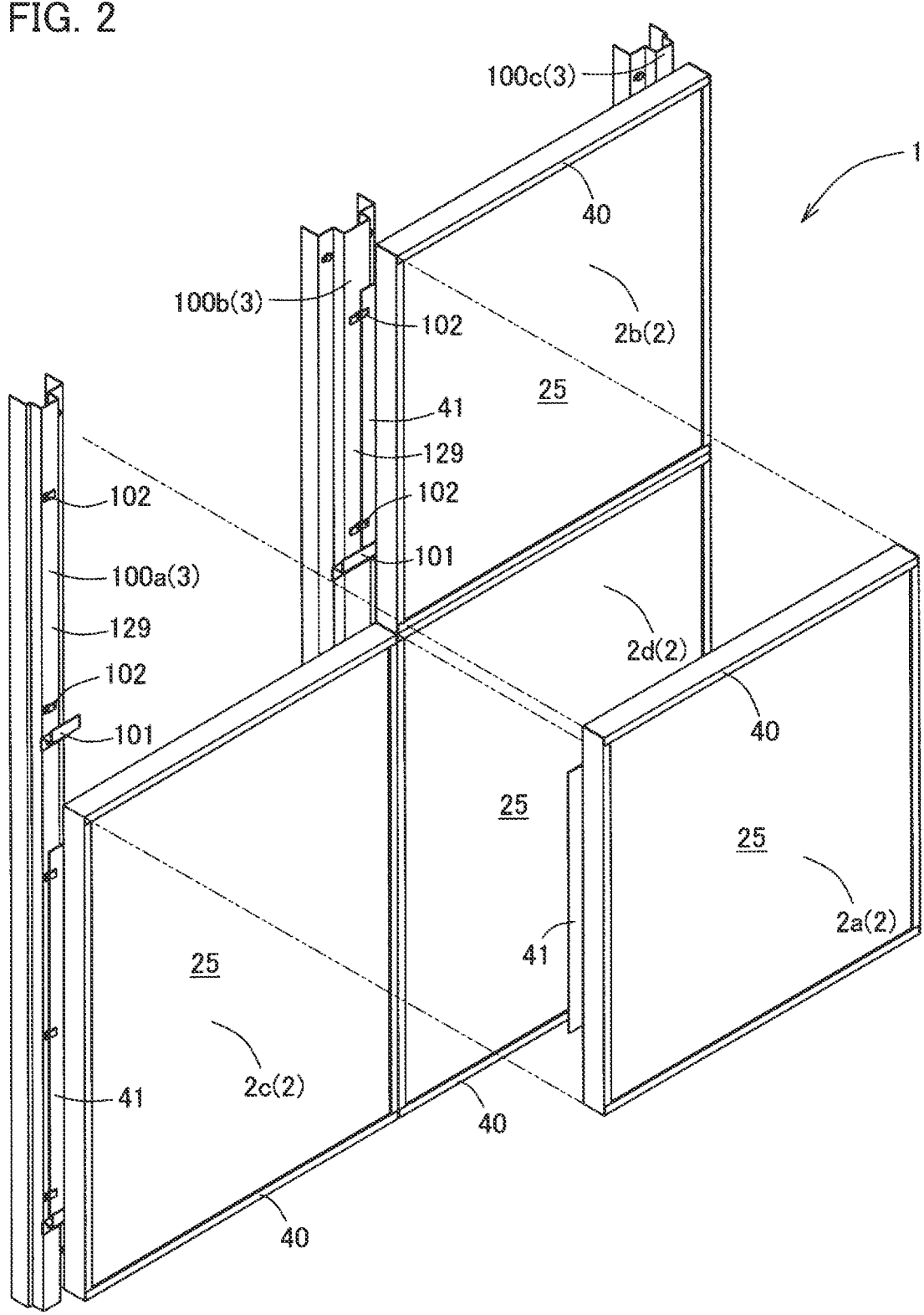
FIG. 2 is an exploded perspective view of the installation structure of FIG. 1.

As illustrated in FIGS. 1 and 2, in a solar cell module installation structure 1 (hereinafter, also simply referred to as an installation structure 1) of a first embodiment of the present invention, a plurality of solar cell modules 2 (2a to 2d) are installed on a wall surface 200 of a building by support members 3. Specifically, the installation structure 1 includes the plurality of solar cell modules 2a to 2d and the support members 3, and the solar cell modules 2a to 2d are arranged vertically and laterally in a matrix when viewed from the front.

The installation structure 1 of the present embodiment is mainly employed for a house, and is installed on a wall surface 200 of the house, thereby constituting an appearance of the house.

Figure 3:
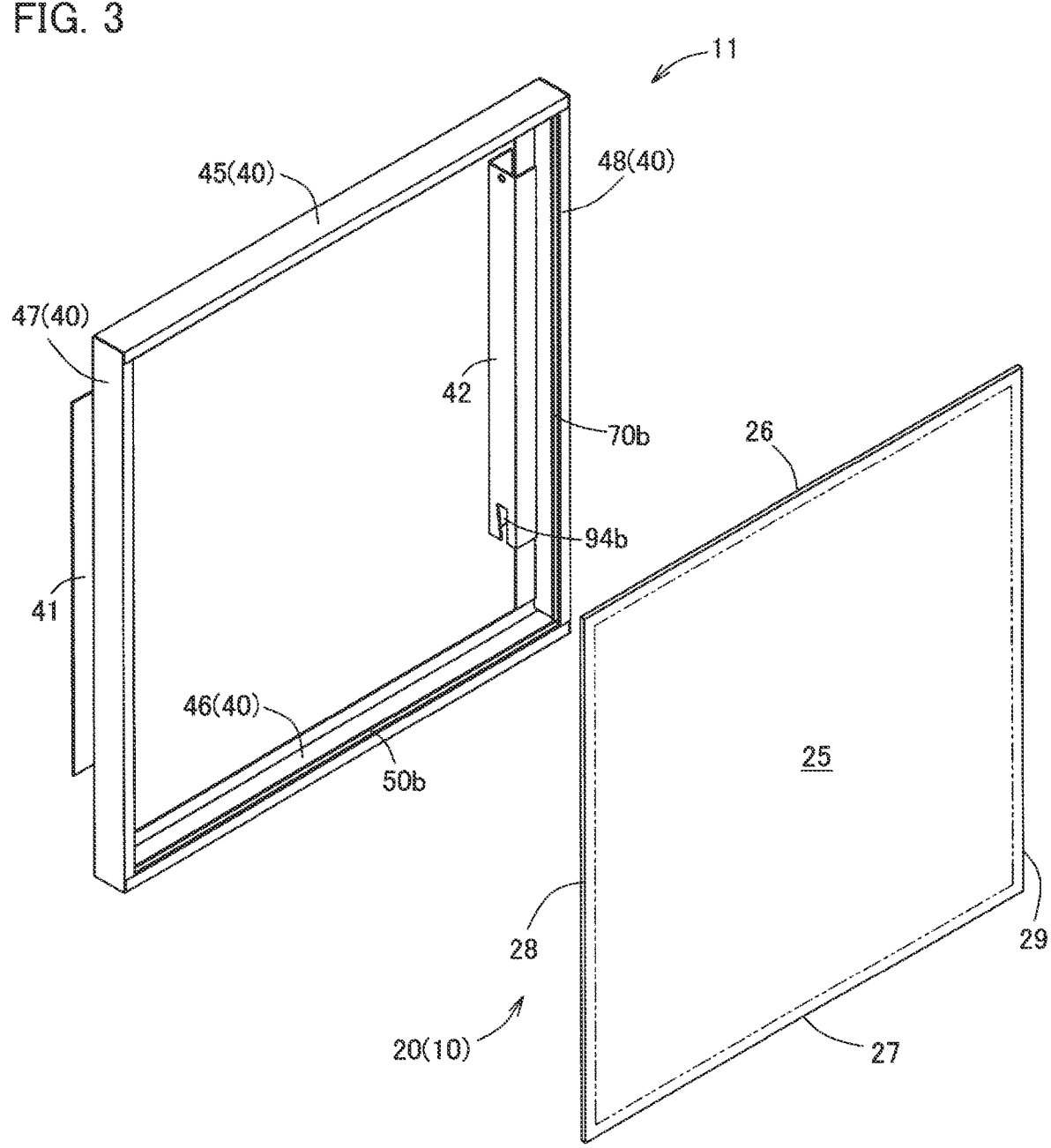
FIG. 3 is an exploded perspective view of the solar cell module of FIG. 2.

As illustrated in FIG. 3, the solar cell modules 2 each include a solar cell panel 10 and a frame member 11 as main constituent members.

The solar cell panel 10 is a photoelectric conversion panel including a solar cell therein, and can convert light energy received by a power generation region 25 into electric energy.

As illustrated in FIG. 4, the solar cell panel 10 mainly includes a main body panel 20, terminal boxes 21a and 21b, and wiring portions (wiring parts) 22a and 22b.

The main body panel 20 is made such that a solar cell is formed on a glass substrate and is sealed with sealing glass or a sealing film.

Figure 4A:
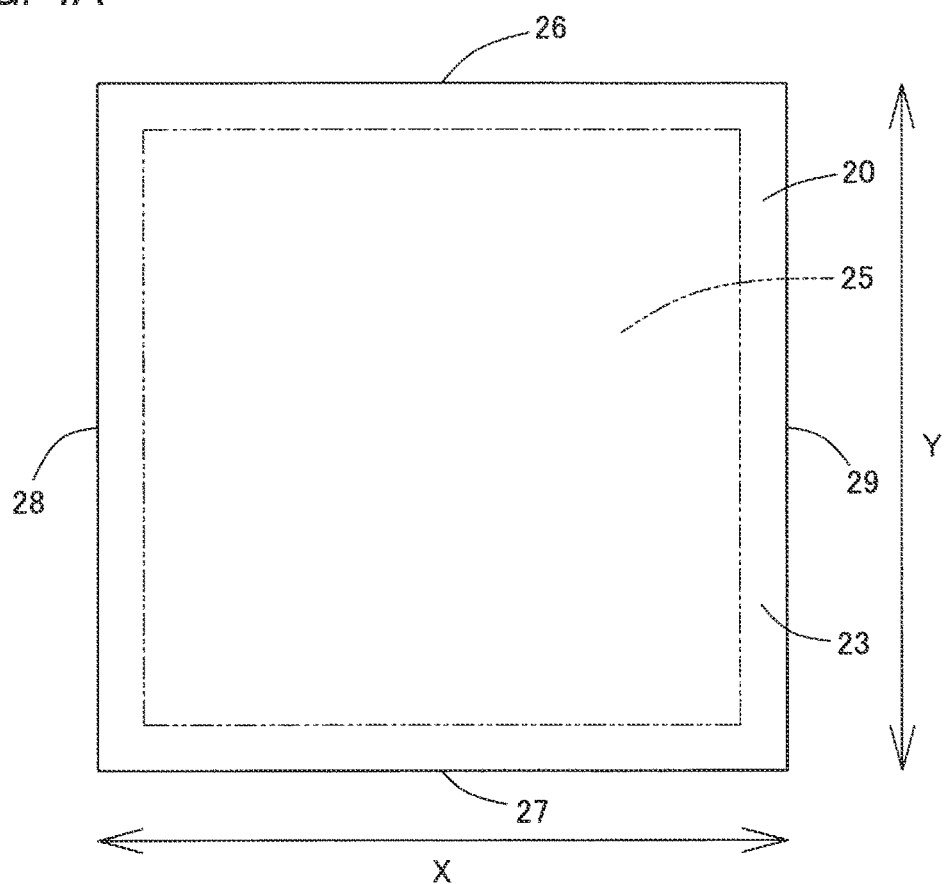
Figure 4B:
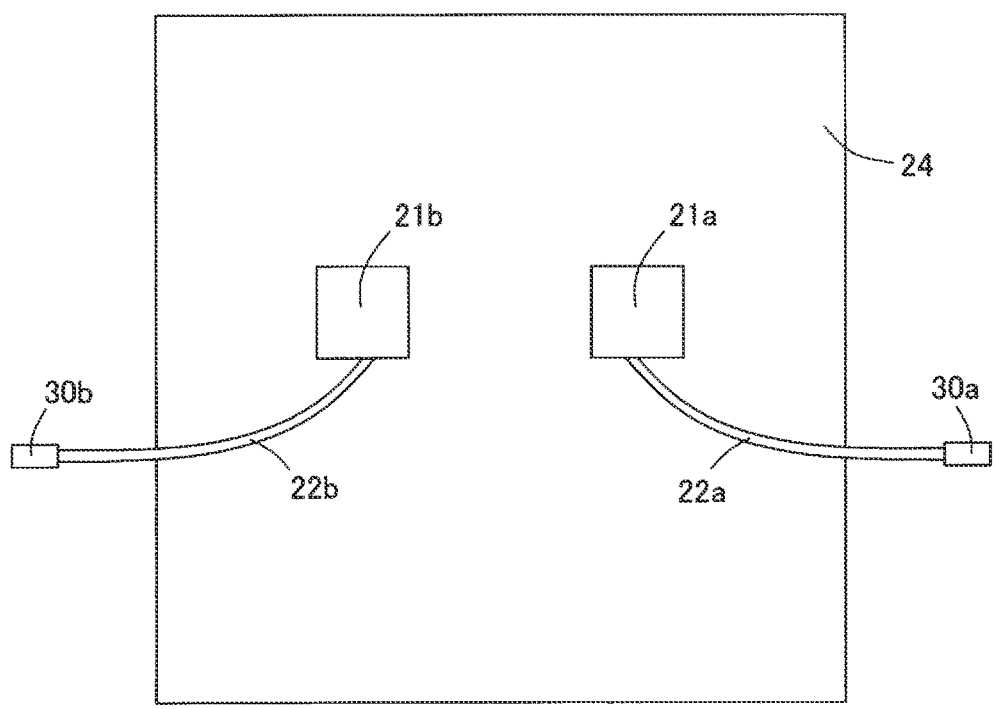

As illustrated in FIGS. 4A and 4B, the main body panel 20 is a plate-shaped panel that has a light receiving surface 23 (first main surface) and a back surface 24 (second main surface) and has a quadrangular shape when the light receiving surface 23 is viewed from the front.

As illustrated in FIG. 4A, when viewed from the front, the light receiving surface 23 has lateral sides 26 and 27 extending in a lateral direction X and longitudinal sides 28 and 29 extending in a longitudinal direction Y, and the power generation region 25 is at the center.

As illustrated in FIG. 4B, the terminal boxes 21a and 21b are provided at a central part of the back surface 24 of the main body panel 20, and are used to connect wiring extending from the solar cell to the wiring portions 22a and 22b inside the main body panel 20.

The terminal boxes 21a and 21b are provided at the central part of the back surface 24 of the main body panel 20, and are arranged side by side at an interval in the lateral direction X.

The wiring portions 22a and 22b are the wiring that extends from the terminal boxes 21a and 21b, and connect the solar cell of the main body panel 20 to which the wiring portions 22a and 22b are connected, to the solar cell of the main body panel 20 of another solar cell module 2 or to an external power source.

The wiring portions 22a and 22b are the wiring respectively connected to one of the different electrodes of the solar cell in the main body panel 20 inside the terminal boxes 21a and 21b. Specifically, the wiring portion 22a is positive electrode wiring whose base end is connected to a positive electrode of the solar cell of the main body panel 20, and the wiring portion 22b is negative electrode wiring whose base end is connected to a negative electrode of the solar cell of the main body panel 20.

The wiring portions 22a and 22b are respectively provided with connector portions 30a and 30b connectable to other wiring portions 22b and 22a, at the distal ends (ends on the opposite side to terminal boxes 21a and 21b) of the wiring portions 22a and 22b.

Figure 5:
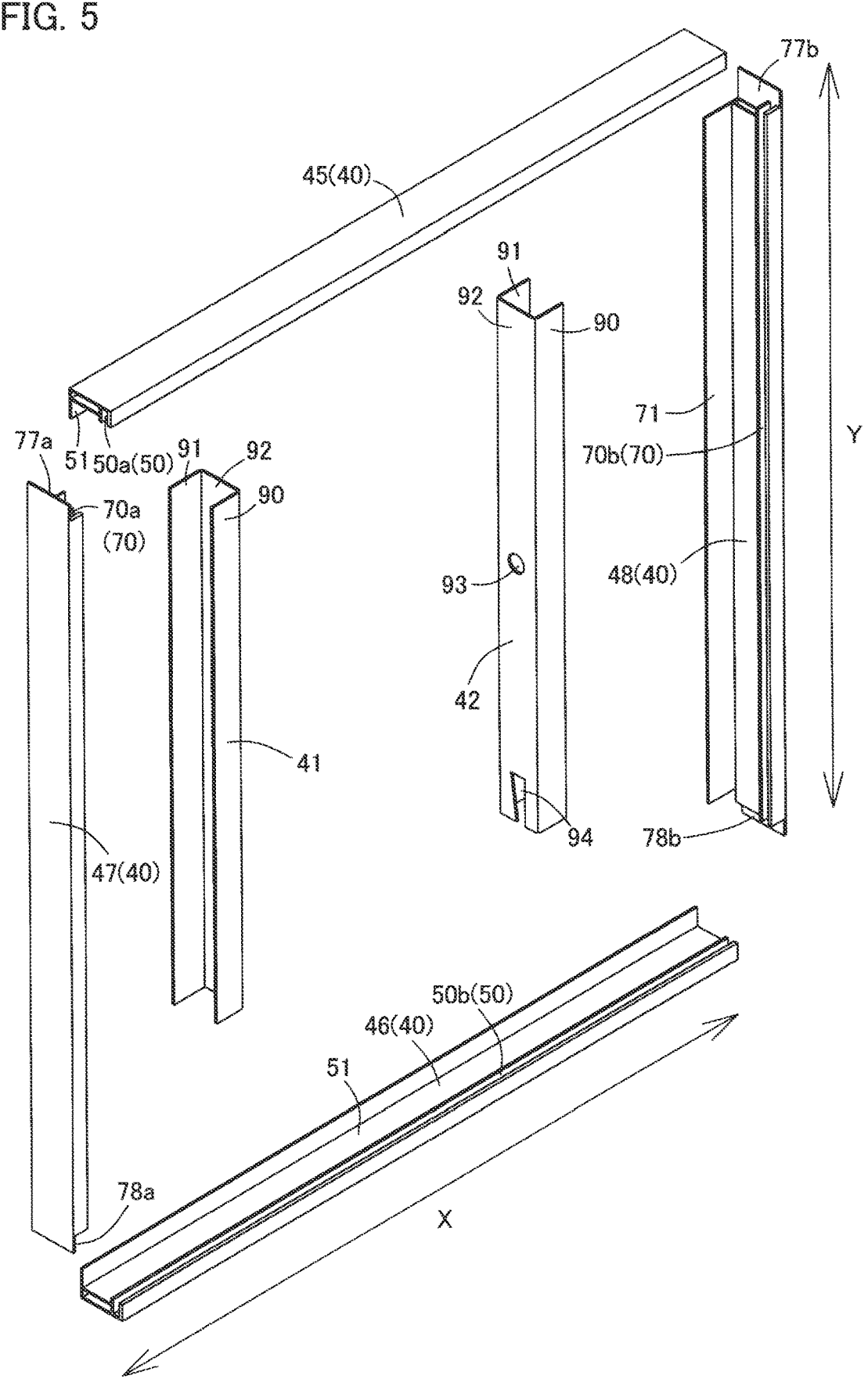
FIG. 5 is an exploded perspective view of the frame member of FIG. 3.

As illustrated in FIG. 5, the frame member 11 includes a holding frame 40 and mounting frames 41 and 42 (mounting parts).

The holding frame 40 is a frame for holding the main body panel 20, and is a reinforcing frame having flexural rigidity higher than the rigidity of the main body panel 20. Specifically, the holding frame 40 is a metal frame made of aluminum.

As illustrated in FIG. 3, the holding frame 40 is a quadrangular-shaped frame when viewed from the front, and extends along sides 26 to 29 of main body panel 20 so as to surround the power generation region 25.

As illustrated in FIG. 5, the holding frame 40 includes lateral frames 45 and 46 and longitudinal frames 47 and 48.

Figure 6:
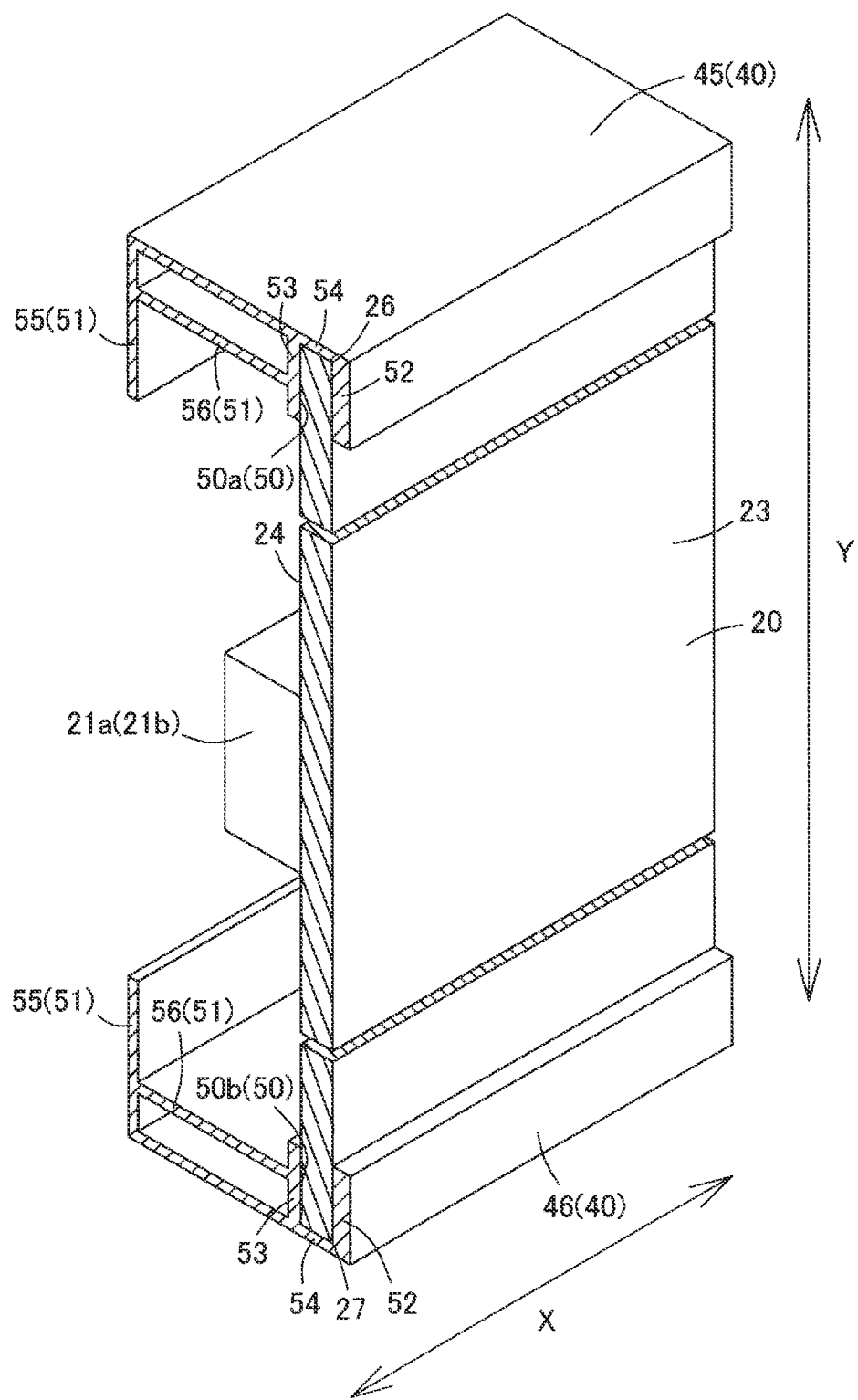
FIG. 6 is a vertical cross-sectional perspective view of the solar cell module of FIG. 2 as viewed from the upper side of the front.

As illustrated in FIGS. 5 and 6, the lateral frames 45 and 46 are elongated frames extending in the lateral direction X along the lateral sides 26 and 27, and each have a holding recess 50 and a space keeping piece 51.

As illustrated in FIG. 6, each of the holding recesses 50 is a recess that holds the vicinity of an end of the solar cell panel 10 in the longitudinal direction Y and protects an end face including one of the lateral sides 26 and 27 of the solar cell panel 10.

Each of the holding recesses 50 has a U-shaped cross-section and extends along one of the lateral sides 26 and 27, and includes a front side cover part 52, a rear side cover part (back surface side cover part) 53, and an end side cover 54.

As illustrated in FIG. 6, the front side cover parts 52 are parts that cover the light receiving surface 23 side of the solar cell panel 10.

The rear side cover parts 53 are parts that cover the back surface 24 side of the solar cell panel 10, and face the front side cover parts 52 with the solar cell panel 10 interposed therebetween.

The end side covers 54 are parts that cover the end faces, in the longitudinal direction Y, of the solar cell panel 10, and connect the ends of their corresponding front side cover parts 52 and rear side cover parts 53. Specifically, each of the front side cover parts 52 and its corresponding rear side cover part 53 are erected in the same direction from the ends of the corresponding end side cover 54, and extend toward the inside (center side of the main body panel 20).

As illustrated in FIG. 6, the space keeping pieces 51 are parts that secure installation spaces for the terminal boxes 21a and 21b of the solar cell panel 10, and each are configured with an opposing wall part 55 and a connection wall part 56.

Each of the opposing wall parts 55 is a wall part that faces its corresponding rear side cover part 53 with an interval therebetween, on the back side of that rear side cover part 53.

Each of the connection wall parts 56 is a wall part that connects its corresponding rear side cover part 53 and opposing wall part 55, and is erected from that rear side cover part 53 and also erected from that opposing wall part 55.

Specifically, each of the opposing wall parts 55 is erected in the same direction as its corresponding rear side cover part 53 and extends toward the inside (center side of the main body panel 20).

Figure 7:
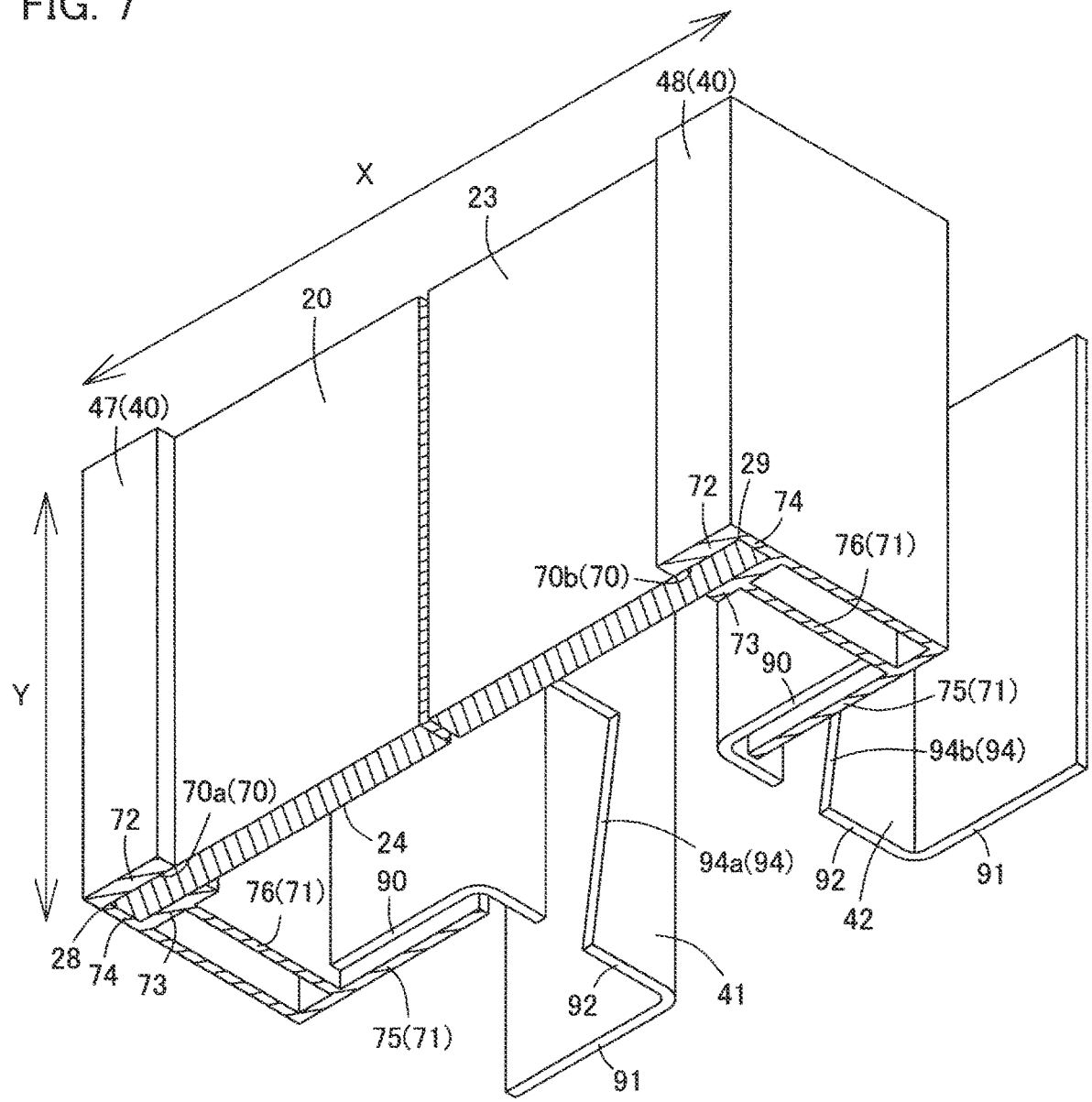
FIG. 7 is a lateral cross-sectional perspective view of the solar cell module of FIG. 2 as viewed from the lower side of the front.

As illustrated in FIGS. 5 and 7, the longitudinal frames 47 and 48 are elongated frames extending in the longitudinal direction Y along the longitudinal sides 28 and 29, and each have a holding recess 70, a space keeping piece 71, and coupling parts 77 and 78.

As illustrated in FIG. 7, each of the holding recesses 70 is a recess that holds the vicinity of the end, in the lateral direction X, of the solar cell panel 10 and protects an end face including one of the longitudinal sides 28 and 29 of the solar cell panel 10.

Each of the holding recesses 70 has a U-shaped cross-section and extends along one of the longitudinal sides 28 and 29, and includes a front side cover part 72, a rear side cover part 73, and an end side cover 74.

The front side cover part 72 is a part that covers the light receiving surface 23 side of the solar cell panel 10.

The rear side cover part 73 is a part covering the back surface 24 side of the solar cell panel 10, and faces its corresponding front side cover part 72 with the solar cell panel 10 interposed therebetween.

Each of the end side covers 74 is a part covering one of end faces, in the lateral direction X, of the solar cell panel 10, and connects the ends of its corresponding front side cover part 72 and rear side cover part 73. Specifically, each of the front side cover parts 72 and its corresponding rear side cover part 73 are erected in the same direction from the ends of their corresponding end side covers 74, and extend toward the inside (center side of the main body panel 20).

The space keeping pieces 71 are parts that secure an installation space for the terminal boxes 21a and 21b of the solar cell panel 10, and each are composed of an opposing wall part 75 (locking wall part) and a first connection wall part 76 as illustrated in FIG. 7.

Each of the opposing wall parts 75 is a wall part that faces its corresponding rear side cover part 73, on the back side of that rear side cover part 73 with an interval therebetween, and also serves as a locking wall part that engages with one of the mounting frames 41 and 42.

Each of the first connection wall parts 76 is a wall part that connects its corresponding rear side cover part 73 and opposing wall part 75, and is erected from that rear side cover part 73 and also erected from that opposing wall part 75.

Specifically, the opposing wall parts 75 are erected in the same direction as their corresponding rear side cover parts 73 and extend toward the inside (center side of the main body panel 20).

As illustrated in FIG. 5, the coupling parts 77 and 78 are portions that are provided at the ends of the longitudinal frames 47 and 48 in the longitudinal direction and are respectively coupled to the ends of the lateral frames 45 and 46.

The mounting frames 41 and 42 are mounting parts to be mounted to the support members 3, and also serve as reinforcing frames to reinforce the rigidity of the solar cell panel 10.

As illustrated in FIG. 5, the mounting frames 41 and 42 extend along the longitudinal frames 47 and 48, and the lengths of the mounting frames 41 and 42 in the longitudinal direction are preferably more than or equal to ½ of the lengths of the longitudinal sides 28 and 29 of the main body panel 20 and are more preferably more than or equal to ¾.

The lengths of the mounting frames 41 and 42 in the longitudinal direction are preferably shorter than the longitudinal lengths of the longitudinal frames 47 and 48.

The mounting frames 41 and 42 have flexural rigidity higher than that of the main body panel 20, and are specifically metal frames made of metal.

As illustrated in FIG. 5, the mounting frames 41 and 42 are elongated frames having a U-shaped cross-section, and each include a panel-side wall part 90, a support-side wall part 91, and a second connection wall part 92.

As illustrated in FIG. 7, the panel-side wall part 90 is an engagement wall part that is mounted by being engaged with the opposing wall part 75 of the longitudinal frame 47 (or the opposing wall part 75 of the longitudinal frame 48).

Each of the support-side wall part 91 is a wall part facing its corresponding panel-side wall part 90 with an interval therebetween, on the back side of that panel-side wall part 90. Each of the support-side wall parts 91 also serves as an engagement wall part to be engaged with the locking piece 101 (see FIG. 2) and the engagement part 102 (see FIG. 2) of its corresponding support member 3. That is, the support-side wall parts 91 function as mounting parts with respect to the support members 3.

The second connection wall parts 92 are wall parts that connect the panel-side wall parts 90 and the support-side wall parts 91. That is, each of the panel-side wall parts 90 and its corresponding support-side wall part 91 are erected in the same direction from both end parts of their corresponding second connection wall part 92, and extend outward.

Figure 8:
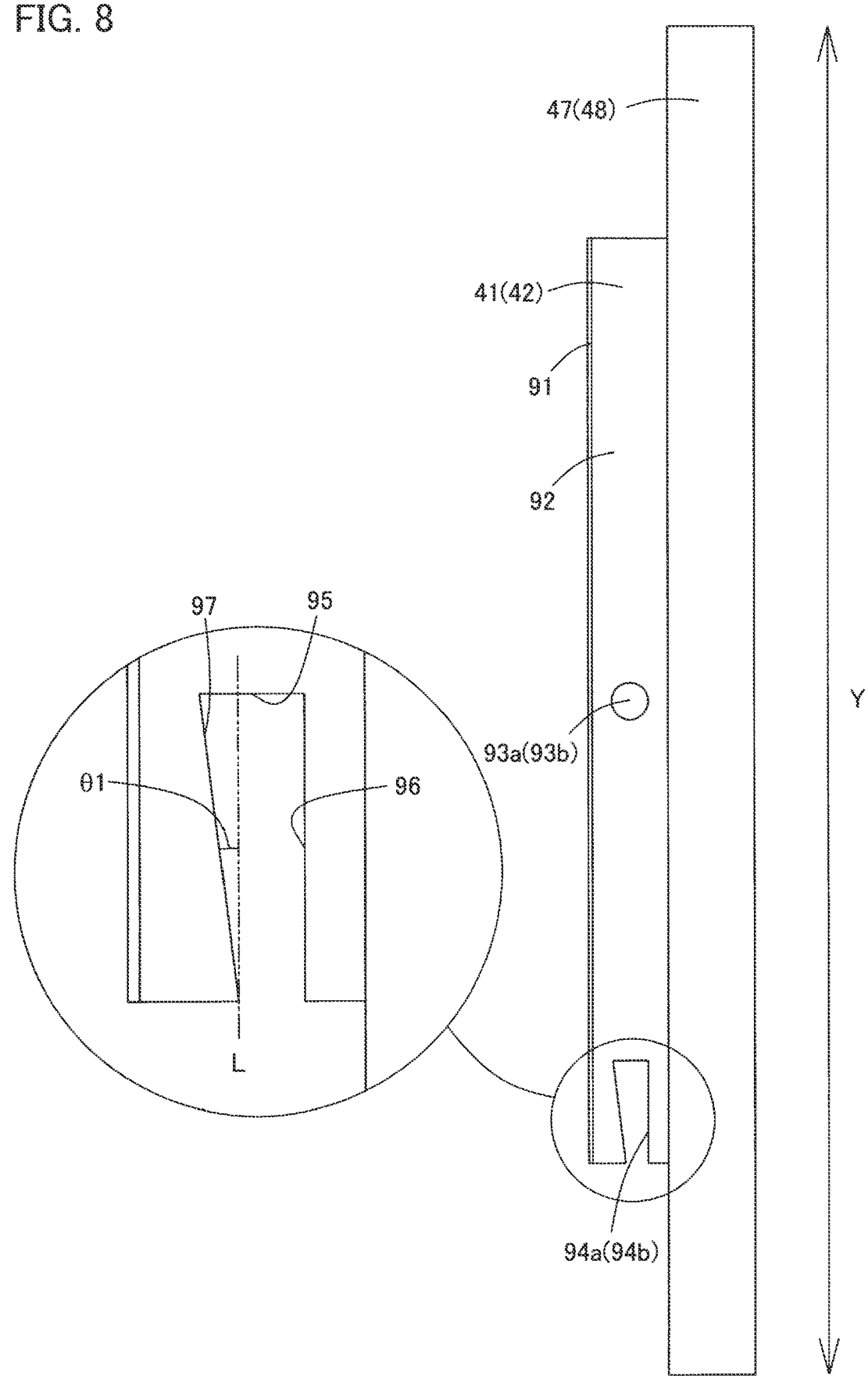
FIG. 8 is a side view of the solar cell module of FIG. 2.

As illustrated in FIGS. 5 and 8, each of the second connection wall parts 92 includes a wiring hole 93 (93a, 93b) (penetration part) and a notch part 94 (94a, 94b) (mounting-side engagement part).

As illustrated in FIG. 8, the wiring holes 93a and 93b are through holes that are respectively provided at middle parts of the mounting frames 41 and 42 in the longitudinal direction and penetrate through the second connection wall parts 92 and 92 in the thickness direction. In other words, the wiring holes 93a and 93b are respectively penetration parts penetrating the second connection wall parts 92 and 92 from the inside to the outside with reference to the terminal boxes 21a and 21b when the light receiving surface 23 is viewed from the front.

The term "middle part" above refers to a part other than both end parts in one direction and any part between the both end parts. The same applies hereinafter.

The wiring holes 93a and 93b of the present embodiment are respectively arranged at positions corresponding to the terminal boxes 21a and 21b with respect to the longitudinal direction Y, and specifically, are provided at central parts of the second connection wall parts 92 in the longitudinal direction Y.

Figure 9:
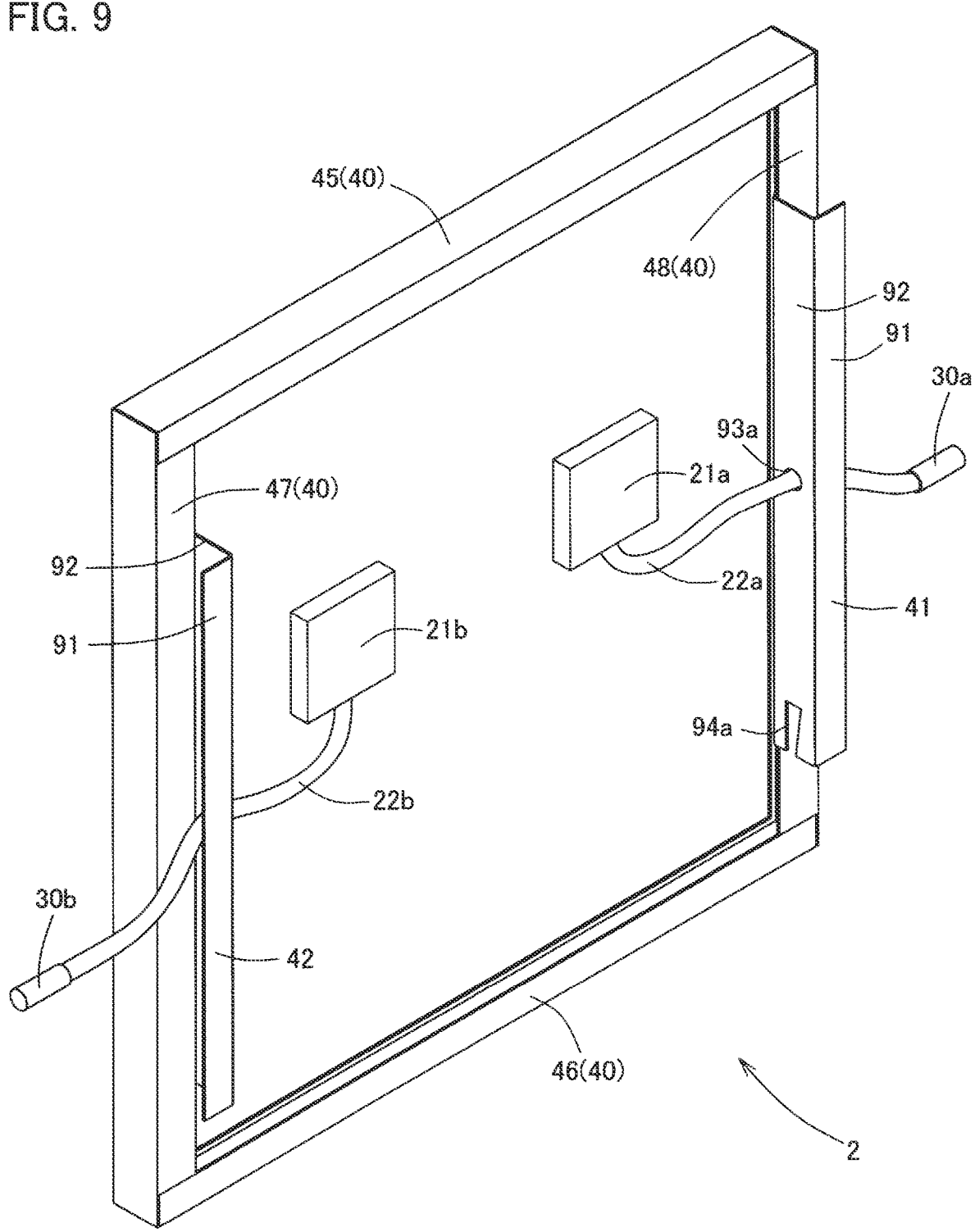
FIG. 9 is a perspective view of the solar cell module of FIG. 2 as viewed from the upper side of the back.

As illustrated in FIG. 9, the wiring holes 93a and 93b respectively allow the connector portions 30a and 30b of the wiring portions 22a and 22b extendingly provided from the terminal boxes 21a and 21b to pass therethrough.

The opening shapes of the wiring holes 93a and 93b are not particularly limited. The opening shapes may be a circular shape as illustrated in FIG. 5, may be a polygonal shape such as a triangle, a quadrangle, or a pentagon, or may be an elliptical shape, an oval shape, or the like.

As illustrated in FIG. 8, the notch parts 94a and 94b are notches respectively provided at lower end parts of the second connection wall parts 92 and 92 of the mounting frames 41 and 42 in the vertical direction, and are engagement parts engageable with the locking parts 132 (see FIG. 10) of the support members 3.

The notch parts 94a and 94b have a width in the thickness direction of the solar cell panel 10, respectively have lengths in the extending directions of the mounting frames 41 and 42, and have a depth extending upward in the vertical direction.

As in the enlarged view of FIG. 8, each notch part 94 (94a, 94b) has a trapezoidal shape in side view, and includes a bottom wall part 95, a first inner wall part 96 (parallel surface), and a second inner wall part 97 (inclined surface).

The bottom wall part 95 is a wall part which constitutes a bottom part of the notch part 94 and with which an end face of the locking part 132 comes in contact when attached to the support member 3. The bottom wall part 95 constitutes an upper end part of the notch part 94 in an installed state.

The first inner wall part 96 is a vertical wall part hanging downward in the vertical direction from a front end part of the bottom wall part 95, and is a parallel surface parallel to the support surface 129 in a state where the installation structure 1 is completed.

The second inner wall part 97 is a wall part obliquely extending from the rear end part of the bottom wall part 95 at a predetermined inclination angle θ with respect to the vertical direction. That is, in side view as illustrated in FIG. 8, the second inner wall part 97 has an inclined surface inclined at a predetermined inclination angle θ1 with respect to a vertical axis L extending in the vertical direction.

The inclination angle θ1 shown in FIG. 8 can be changed as appropriate by an inclination angle θ2 (see FIG. 13) of the inclined posture to be described later, but is preferably more than or equal to 10 degrees, and is more preferably more than or equal to 30 degrees. The inclination angle θ1 is less than 90 degrees, and is more preferably less than or equal to 60 degrees. Within this range, when the solar cell module 2 is in the inclined posture, the locking part 132 hardly falls off from the notch part 94.

In the notch part 94, the distance between the first inner wall part 96 and the second inner wall part 97 is gradually wider toward the depth direction of the notch part 94 (the direction from lower end part to the upper end part of the mounting frame 41 or 42).

Here, a description will be given on the positional relationship between the members in the solar cell module 2.

As illustrated in FIG. 6, in the solar cell module 2, an upper end part of the main body panel 20 in the up-down direction (longitudinal direction Y) is inserted in the holding recess 50a of an upper frame 45, and a lower end part is attached to the holding recess 50b of a lower frame 46 (first frame part). That is, an upper end face of the main body panel 20 is protected by the upper frame 45, and a lower end face of the main body panel 20 is protected by the lower frame 46.

As illustrated in FIG. 7, in the solar cell module 2, the side end of the main body panel 20 on the left side in the left-right direction (lateral direction X) is inserted in the holding recess 70a of a left frame 47 (second frame part), and the side end on the right side is inserted in the holding recess 70b of a right frame 48 (second frame part). That is, when viewed from the front, the side end face, on the left side, of the main body panel 20 is protected by the left frame 47, and the side end face, on the right side, of the main body panel 20 is protected by the right frame 48.

As can be seen from FIG. 5, the coupling parts 77a and 77b respectively provided at the upper ends of the longitudinal frames 47 and 48 are coupled to both end parts of the lateral frame 45, and the coupling parts 78a and 78b respectively provided at lower end parts of the longitudinal frames 47 and 48 are coupled both end parts of the lateral frame 46.

As illustrated in FIG. 2, the power generation region 25 of the solar cell panel 10 is exposed from the frame member 11.

As illustrated in FIG. 7, the mounting frames 41 and 42 are on the back surface 24 side of the main body panel 20, and the panel-side wall parts 90 and 90 are engaged with the opposing wall parts 75 and 75 of the longitudinal frames 47 and 48.

In the mounting frames 41 and 42, the surfaces, of the panel-side wall parts 90 and 90, on the opposite side with respect to the main body panel 20 are in surface contact with the surfaces, of the opposing wall parts 75 and 75, on the main body panel 20 side, and in this state, the mounting frames 41 and 42 and the opposing wall parts 75 and 75 are fixed to each other by fastening elements (not illustrated).

The notch part 94a of the mounting frame 41 overlaps the notch part 94b of the mounting frame 42 when viewed from the side. In other words, the notch part 94a of the mounting frame 41 is located on the projection surface of the notch part 94b of the mounting frame 42 in the lateral direction X.

Figure 10:
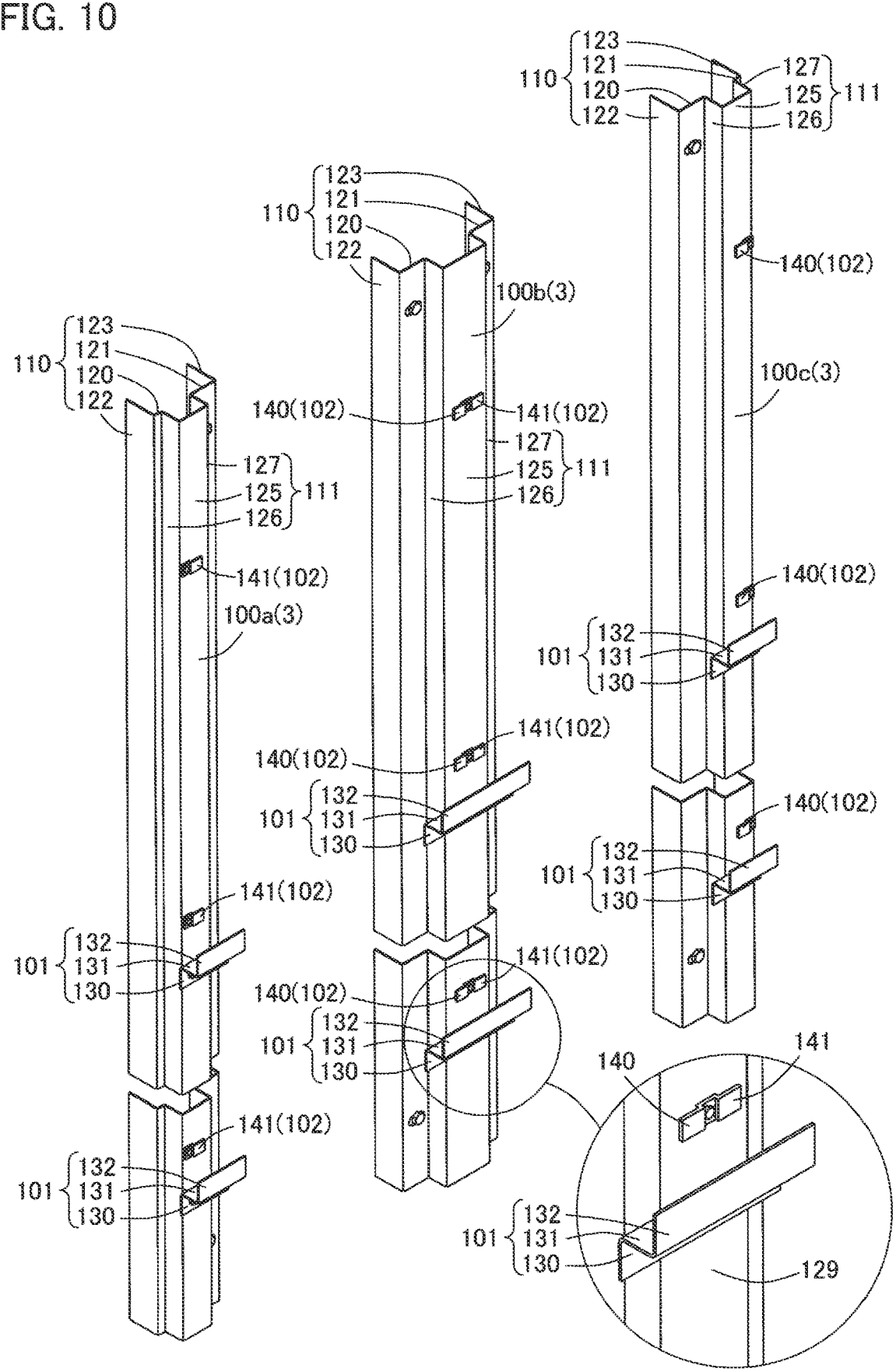
FIG. 10 is a perspective view of the support members of FIG. 2.

As illustrated in FIGS. 1 and 2, the support members 3 are members that extend in the vertical direction (longitudinal direction Y) and support the solar cell modules 2 with respect to the wall surface 200, and as illustrated in FIG. 10, the support members 3 include rail parts 100a to 100c, locking pieces 101, and engagement parts 102.

The rail parts 100a to 100c are rails attached across the plurality of framework portions 202 (see FIG. 11) of the wall surface 200, and are rails extending in the vertical direction (longitudinal direction Y).

As illustrated in FIG. 10, the rail parts 100a to 100c each include a base part 110 and a raised part 111 rising from the base part 110.

The base part 110 is a part attached to the framework portions 202, and includes: top end cover parts 120 and 121 covering top end surfaces of the framework portions 202 in the protruding direction thereof; and a side cover parts 122 and 123 covering the sides of the framework portions 202.

The raised part 111 is a part rising from the base part 110, and includes a support part 125 and vertical wall parts 126 and 127.

The support part 125 is a part constituting an end face of the raised part 111 in the raised direction.

As illustrated in an enlarged view of FIG. 10, at the end in the raised direction, the support part 125 has the support surface 129 that spreads out substantially in the vertical direction.

As illustrated in FIG. 10, the vertical wall parts 126 and 127 are wall parts erected from the base part 110 and connected to both end parts, in the width direction, of the support part 125. In other words, the support part 125 together with the top end cover parts 120 and 121 of the base part 110 constitute a step and continue in a step shape via the vertical wall parts 126 and 127.

As in the enlarged view of FIG. 10, the locking piece 101 is a portion attached to the support surface 129 of the support part 125. The locking piece 101 is engaged with the frame member 11 of the solar cell module 2, and is a bracket that receives a load of the solar cell module 2.

The locking piece 101 includes a fixed part 130 (connection part), a vertical wall part 131 (connection part), and the locking part 132.

The fixed part 130 is a part fixed to the support surface 129 of the support part 125.

The vertical wall part 131 is a wall part rising from the fixed part 130 in a crossing direction (orthogonal direction in the present embodiment) with respect to the fixed part 130.

The locking part 132 is a part bent upward from an end part of the vertical wall part 131 in the rising direction, and forms a step together with the fixed part 130, and continues in a step shape via the vertical wall part 131. In other words, the locking part 132 faces the support surface 129 at an interval, and the locking part 132 and the support surface 129 are parallel to each other.

The engagement parts 102 are rotatably fixed to the support parts 125 by fastening elements, and the claw portions 140 and 141 can be engaged with the support-side wall part 91 of the mounting frame 41 to lock the solar cell module 2.

The wall surface 200 constitutes an outer wall of a building and is a vertical wall rising substantially in the vertical direction (in the present embodiment, a direction orthogonal to a horizontal plane) with respect to a floor surface (horizontal plane).

Figure 11:
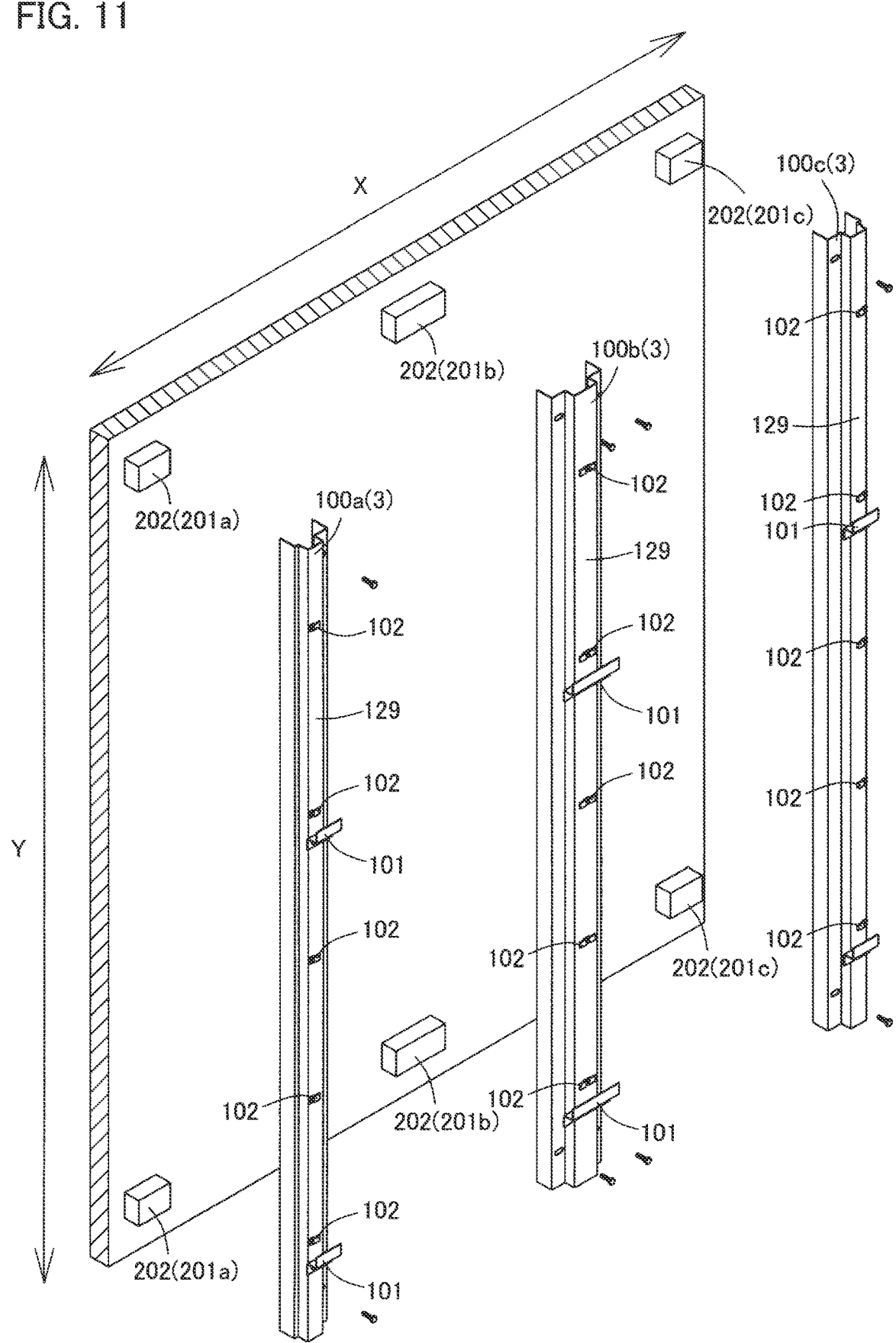
FIG. 11 is an explanatory view of a construction procedure of the solar cell module installation structure of FIG. 1, and is a perspective view when the support members are attached to a wall surface.

As illustrated in FIG. 11, in the wall surface 200, a plurality of framework groups 201a to 201c are parallelly provided in the lateral direction X (left-right direction) when viewed from the front.

The framework groups 201a to 201c are each configured with a plurality of framework portions 202 linearly arranged side by side in the longitudinal direction Y (vertical direction). The framework portions 202 are protruding portions each having a quadrangular prism shape and protruding forward with respect to the wall surface 200.

Next, a typical construction method of the installation structure 1 will be described together with the positional relationship between the members.

First, as illustrated in FIG. 11, the rail parts 100a to 100c of the support members 3 are respectively placed on the framework portions 202 of the framework groups 201a to 201c of the wall surface 200 and are fixed. That is, the rail parts 100a to 100c are fixed to be parallelly disposed in the left-right direction (lateral direction X) such that the extending directions of the rail parts 100a to 100c are in the up-down direction (longitudinal direction Y) when the wall surface 200 is viewed from the front.

Regarding the locking pieces 101 at this time, as illustrated in FIG. 10, the fixed parts 130 are fixed in surface contact with the support surfaces 129 of the support parts 125, the vertical wall parts 131 constitute bottom surfaces, and the locking parts 132 extend upward in the vertical direction.

Figure 12:
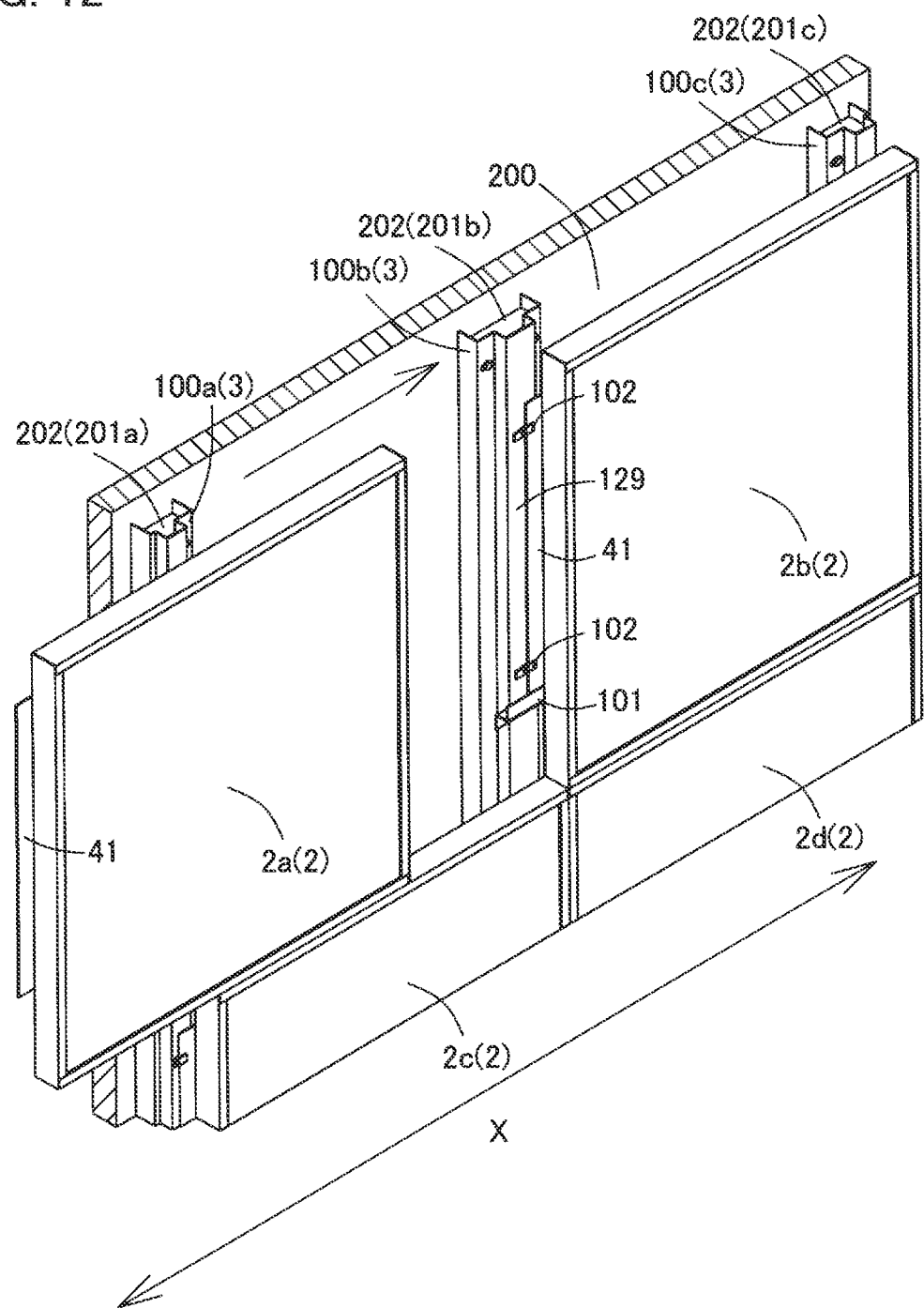
FIG. 12 is an explanatory view of a construction procedure of the solar cell module installation structure of FIG. 1, and is a perspective view when the solar cell modules are aligned in the lateral direction.

Next, the locking parts 132 of the locking pieces 101 are inserted into the notch parts 94 of the solar cell module 2 and aligned in the lateral direction X (left-right direction) as illustrated in FIG. 12. Then, as necessary, as illustrated in FIG. 13A, the solar cell module 2 is inclined with respect to the support surfaces 129 (inclined posture), and the wiring portions 22a and 22b extending from the terminal boxes 21a and 21b of the solar cell module 2 are respectively inserted into the wiring holes 93a and 93b.

Figure 13A:
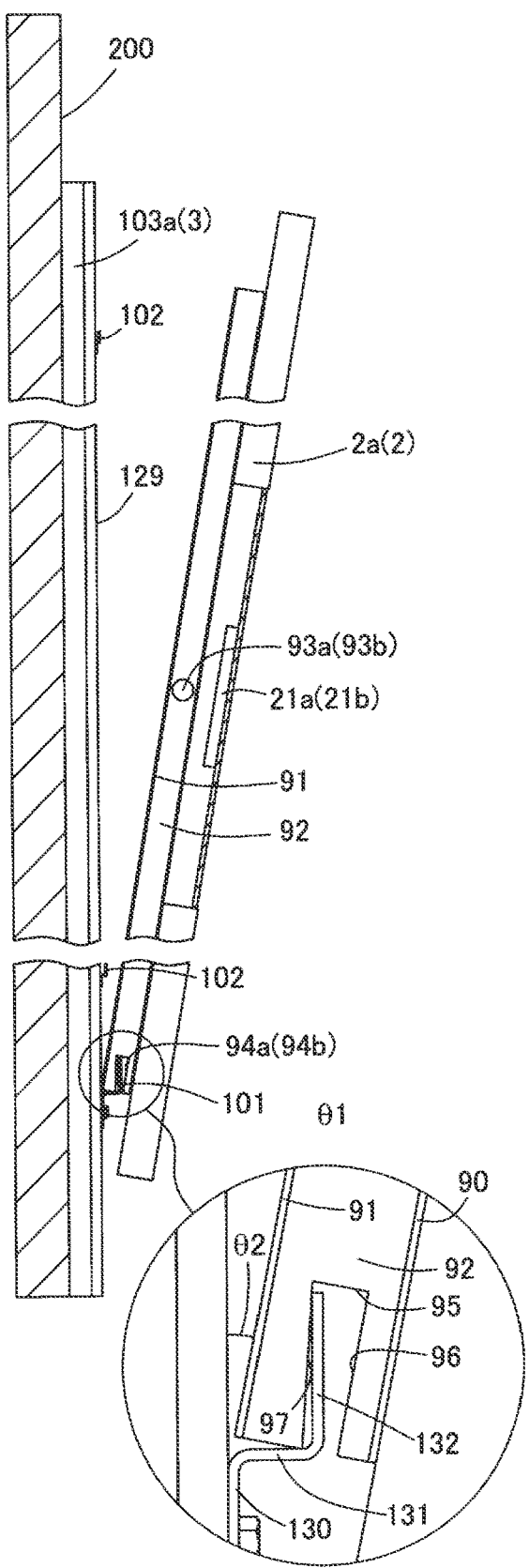

At this time, the solar cell module 2 is inclined with respect to the wall surface 200, and the locking parts 132 of the locking pieces 101 come into contact with the inclined surfaces of the second inner wall parts 97 of the notch parts 94a and 94b as in the enlarged view of FIG. 13A.

In the support members 3, the locking parts 132 are inserted in the notch parts 94 to support the solar cell module 2 at a predetermined inclination angle θ2 with respect to the support surfaces 129.

The inclination angle θ2 shown in the enlarged view of FIG. 13A is more than or equal to 10 degrees and is preferably more than or equal to 30 degrees. In addition, the inclination angle θ2 is less than 90 degrees and is more preferably less than or equal to 60 degrees. Within this range, the locking parts 132 are hardly fall off from the notch parts 94.

Figure 13B:
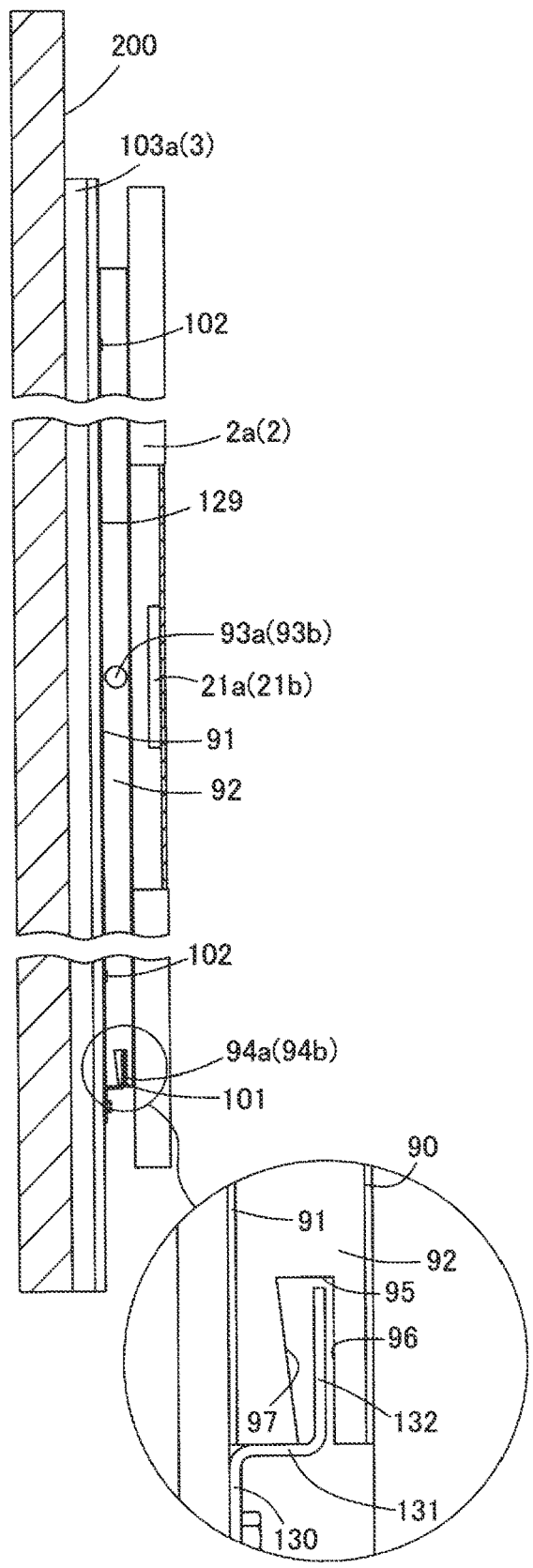

Next, as illustrated in FIG. 13B, the solar cell module 2 is turned toward the wall surface 200 side to be in a state parallel to the wall surface 200 (support surfaces 129) (parallel posture), and the engagement parts 102 of the support members 3 in a posture along the extending direction of the support members 3 are turned to engage the claw portions 140 with the support-side wall parts 91 and 91 of the mounting frames 41 and 42 of the solar cell module 2, so that the solar cell module 2 is installed on the wall surface 200.

At this time, in the solar cell module 2, the light receiving surface 23 is parallel to the wall surface 200, and the first inner wall parts 96 face the locking parts 132 with intervals therebetween as in the enlarged view of FIG. 13B.

Next, the positional relationship between the members of the installation structure 1 will be described.

Figure 15:
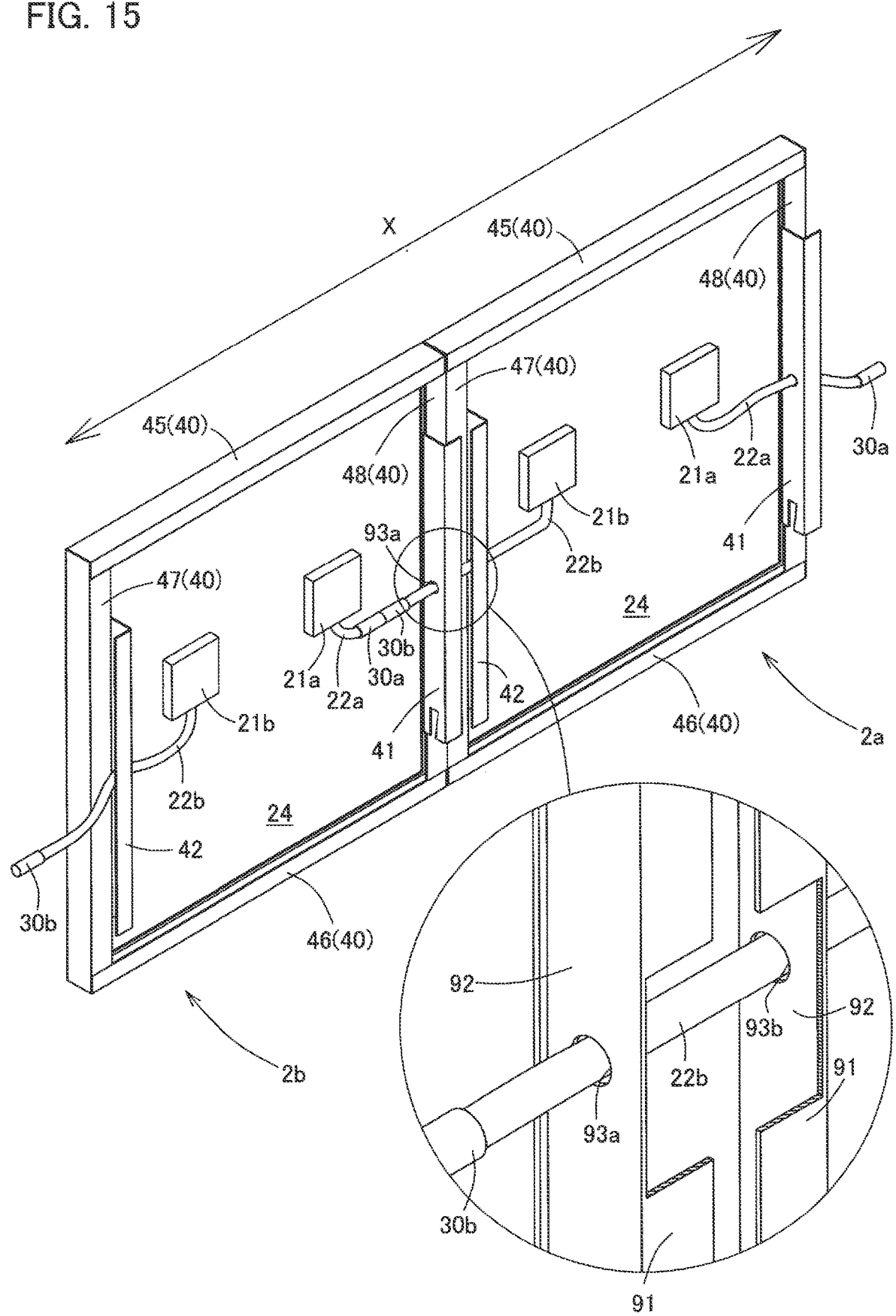
FIG. 15 is a perspective view of the two solar cell modules adjacent to each other in the lateral direction of the installation structure of FIG. 1 as viewed from the upper side of the back.

A first solar cell module 2a and a second solar cell module 2b adjacent to each other in the lateral direction X are electrically connected in series or in parallel. Specifically, as illustrated in FIG. 15, in the first solar cell module 2a, the wiring portion 22b extending from the terminal box 21b passes through the wiring hole 93b, further passes through the wiring hole 93a of the second solar cell module 2b, and is connected to the wiring portion 22a extending from the terminal box 21a of the second solar cell module 2b, on the back surface 24 side of the second solar cell module 2b.

Figure 14:
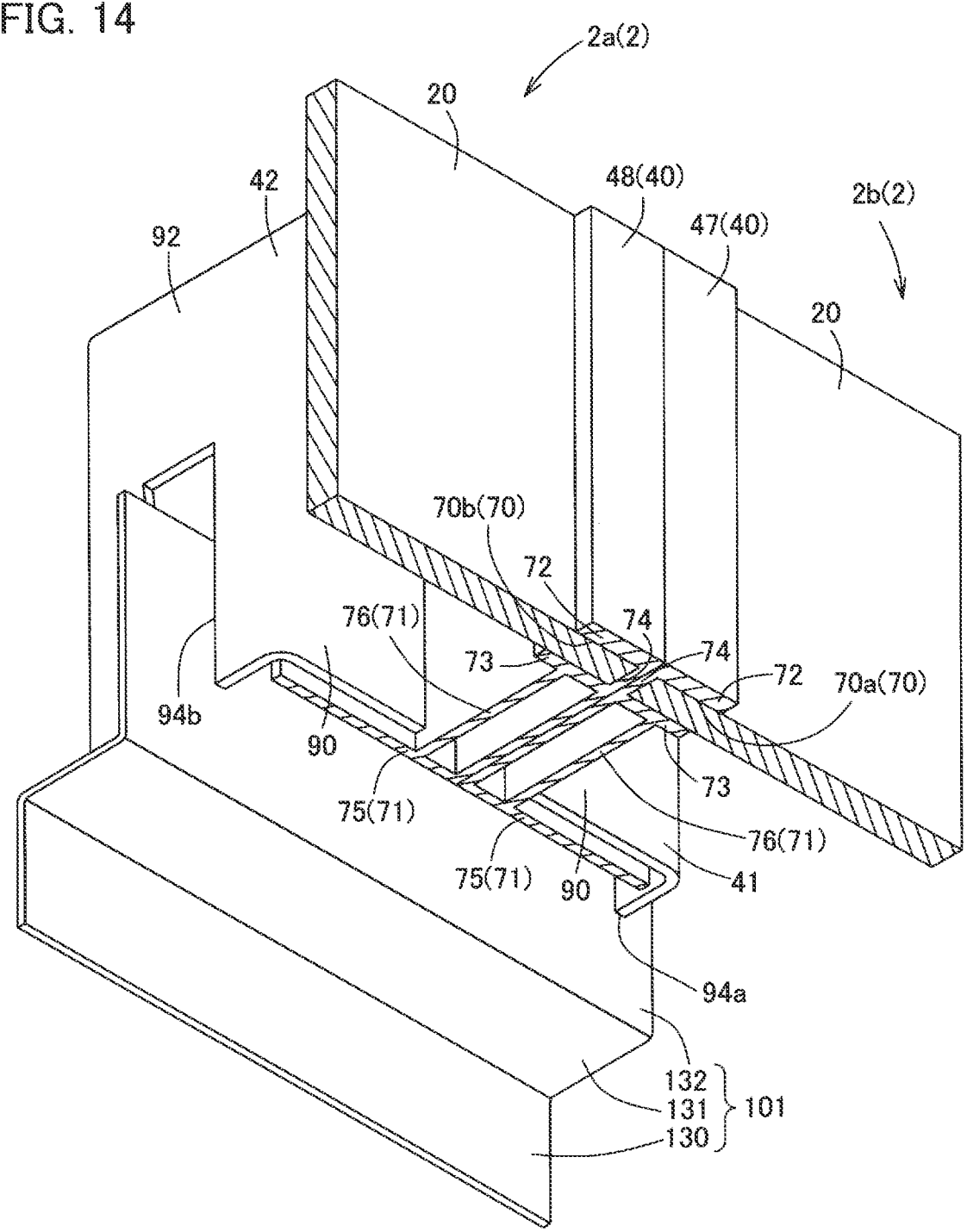
FIG. 14 is a partially broken perspective view of two solar cell modules adjacent to each other in the lateral direction of the installation structure of FIG. 1 as viewed from the lower side of the front.

As illustrated in FIG. 14, the locking piece 101 of the support member 3 is inserted in and engaged across the notch part 94b of the mounting frame 42 of the first solar cell module 2a and the notch part 94a of the mounting frame 41 of the second solar cell module 2b.

In the installation structure 1 of the present embodiment, as illustrated in FIG. 1, the solar cell modules 2a and 2b (2c and 2d) adjacent to each other in the lateral direction X are modules having the same length in the longitudinal direction Y. For the solar cell modules 2a and 2c (2b and 2d) adjacent to each other in the longitudinal direction Y, modules having different lengths in the longitudinal direction Y are used. Specifically, the length, in the longitudinal direction Y, of the solar cell modules 2c and 2d located in the lower stage is longer than the length, in the longitudinal direction Y, of the solar cell modules 2a and 2b located in the upper stage.

According to the installation structure 1 of the present embodiment, the locking parts 132 of the locking pieces 101 of the support members 3 are inserted into the notch parts 94 of the solar cell module 2 to support the solar cell module 2. Therefore, the vertical load of the solar cell module 2 can be received by the locking pieces 101, and the solar cell module 2 is less likely to fall off at the time of assembly, so that the solar cell module 2 can be assembled safely.

In addition, with the installation structure 1 of the present embodiment, the position of the solar cell module 2 in the height direction with respect to the wall surface 200 is determined by the locking pieces 101 of the support members 3; therefore it is easy to position the solar cell module 2.

According to the installation structure 1 of the present embodiment, during the construction process, the solar cell module 2 is inclined relative to the support members 3, along the inclined surfaces provided on the second inner wall parts 97 of the notch parts 94. In this way, a space can be formed between the support surfaces 129 and the solar cell module 2 in a state where the solar cell module 2 is supported by the support members 3; therefore, maintenance of the terminal boxes 21a and 21b can be easily performed.

According to the installation structure 1 of the present embodiment, the mounting frames 41 and 42 have higher rigidity than the main body panel 20, and also reinforce the main body panel 20. Therefore, even if a load is applied by wind or the like, the main body panel 20 is hardly bent in the extending direction of the mounting frames 41 and 42, and more hardly gets damaged.

According to the installation structure 1 of the present embodiment, the following members are separately provided: the holding frame 40 having the holding recesses 50a, 50b, 70a, and 70b for holding the main body panel 20; and the mounting frames 41 and 42 having the support-side wall parts 91 mounted to the support members 3. Therefore, the holding frame 40 and the mounting frames 41 and 42 can be replaced independently, and the maintenance cost can be reduced.

According to the installation structure 1 of the present embodiment, the panel-side wall parts 90 of the mounting frames 41 and 42 and the opposing wall parts 75 of the holding frame 40 are fixed in surface contact. Therefore, even when a load is applied by wind or the like, the mounting frames 41 and 42 are hardly fall off from the holding frame 40.

According to the installation structure 1 of the present embodiment, the locking piece 101 of the support member 3 is inserted in and engaged across the notch part 94b of the mounting frame 42 of the first solar cell module 2a and the notch part 94a of the mounting frame 41 of the second solar cell module 2b. Therefore, the number of components can be reduced.

According to the installation structure 1 of the present embodiment, the solar cell module 2 is supported on the single wall surface 200 by the plurality of rail parts 100a and 100b (100b and 100c) extending substantially in the vertical direction. Therefore, the solar cell module 2 is less likely to fall.

According to the installation structure 1 of the present embodiment, each of the rail parts 100a to 100c is connected to the plurality of framework portions 202 provided side by side in the vertical direction on the wall surface 200. Therefore, the support member 3 is less likely to fall off from the wall surface 200.

According to the installation structure 1 of the present embodiment, the vertical length of the rail parts 100a to 100c in the vertical direction is longer than or equal to the length of the solar cell module 2, the mounting frames 41 and 42 extend along the extending direction of the rail parts 100a to 100c, and the wiring portions 22a and 22b are spatially blocked by the rail parts 100a to 100c or the mounting frames 41 and 42.

According to the installation structure 1 of the present embodiment, although such a structure is employed, the wiring portions 22a and 22b extending from the terminal boxes 21a and 21b respectively pass through the wiring holes 93a and 93b of the mounting frames 41 and 42 and extend to the outside of the mounting frames 41 and 42. Therefore, the wiring portions 22a and 22b can be directly connected to an external power source or another solar cell module 2 without going around the mounting frames 41 and 42. As a result, as compared with the case of going around the mounting frames 41 and 42, the wiring portions 22a and 22b can be simply routed; therefore, the lengths of the wiring portions 22a and 22b can be shortened, and a construction time can be shortened. Therefore, the manufacturing cost can be reduced and the workability at the time of manufacturing is improved as compared with the case of going around the mounting frames 41 and 42.

According to the installation structure 1 of the present embodiment, the wiring portions 22a and 22b are made to pass through the wiring holes 93a and 93b; therefore, the wiring holes 93a and 93b roughly determine positions of the wiring portions 22a and 22b, and it is accordingly easy to position the wiring portions 22a and 22b.

According to the installation structure 1 of the present embodiment, the wiring holes 93a and 93b through which the wiring portions 22a and 22b pass are formed in the second connection wall parts 92; therefore, the wiring portions 22a and 22b can be passed through at substantially the shortest distance, and the manufacturing cost can be accordingly reduced.

According to the installation structure 1 of the present embodiment, as illustrated in FIG. 15, the terminal box 21b of the first solar cell module 2a is off-centered toward the side of the second solar cell module 2b, which is adjacent to the first solar cell module 2a in the lateral direction X (juxtaposing direction), and the terminal box 21a of the second solar cell module 2b is off-centered toward the first solar cell module 2a. Therefore, the length of the wiring portion 22b extending from the terminal box 21b of the first solar cell module 2a and/or the length of the wiring portion 22a extending from the terminal box 21a of the second solar cell module 2b can be shortened, and the manufacturing cost can be reduced.

According to the installation structure 1 of the present embodiment, the wiring portions 22a and 22b are not located between the first solar cell module 2a and the second solar cell module 2b; therefore, the interval between the first solar cell module 2a and the second solar cell module 2b can be narrowed, and the number of solar cell modules 2 installed per unit area can be increased. Further, safety is high.

Next, an installation structure 300 according to a second embodiment of the present invention will be described. Note that the same components as in the installation structure 1 of the first embodiment are denoted by the same reference signs, and description thereof is omitted.

In the installation structure 300 of the second embodiment of the present invention, the holding recesses 50a, 50b, 70a, and 70b of the holding frame 40 and the support-side wall parts 91 and 91 of the mounting frames 41 and 42 are composed of a single member. That is, as illustrated in FIG. 16, the installation structure 300 has a frame member 311, and the frame member 311 has a function of holding a solar cell panel 10 and a function of attaching the solar cell panel 10 to support members 3.

The installation structure 300 includes a plurality of solar cell modules 302 and the support members 3.

Figure 16:
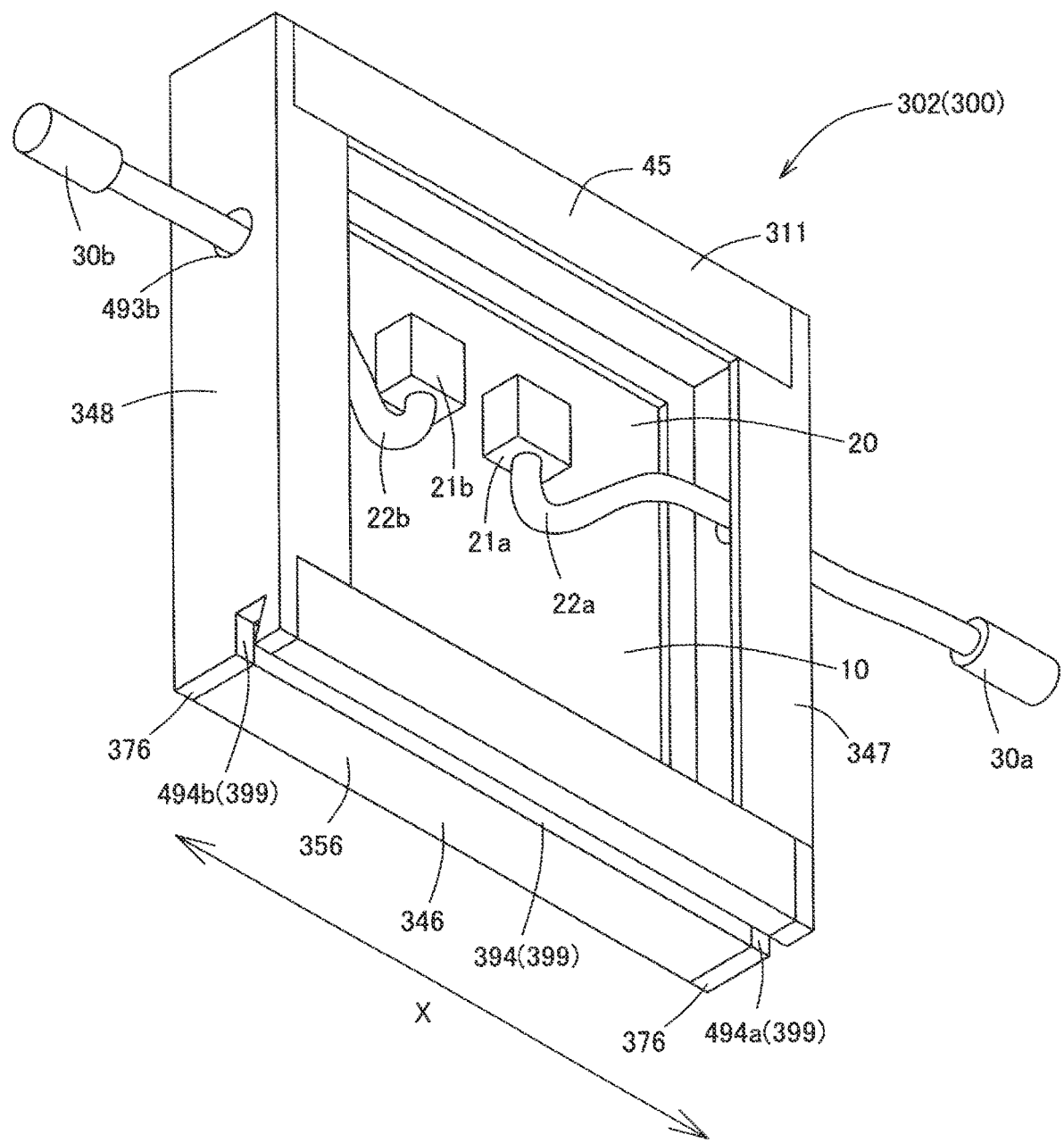
FIG. 16 is a perspective view of a solar cell module of a second embodiment of the present invention as viewed from the lower side of the back.

As illustrated in FIG. 16, the solar cell module 302 includes the solar cell panel 10 and the frame member 311 as main constituent members.

The frame member 311 is a frame that holds a main body panel 20, and is specifically a metal frame made of aluminum.

As illustrated in FIG. 16, the frame member 311 includes lateral frames 45 and 346 (mounting parts) and longitudinal frames 347 and 348 (mounting parts).

Figure 17:
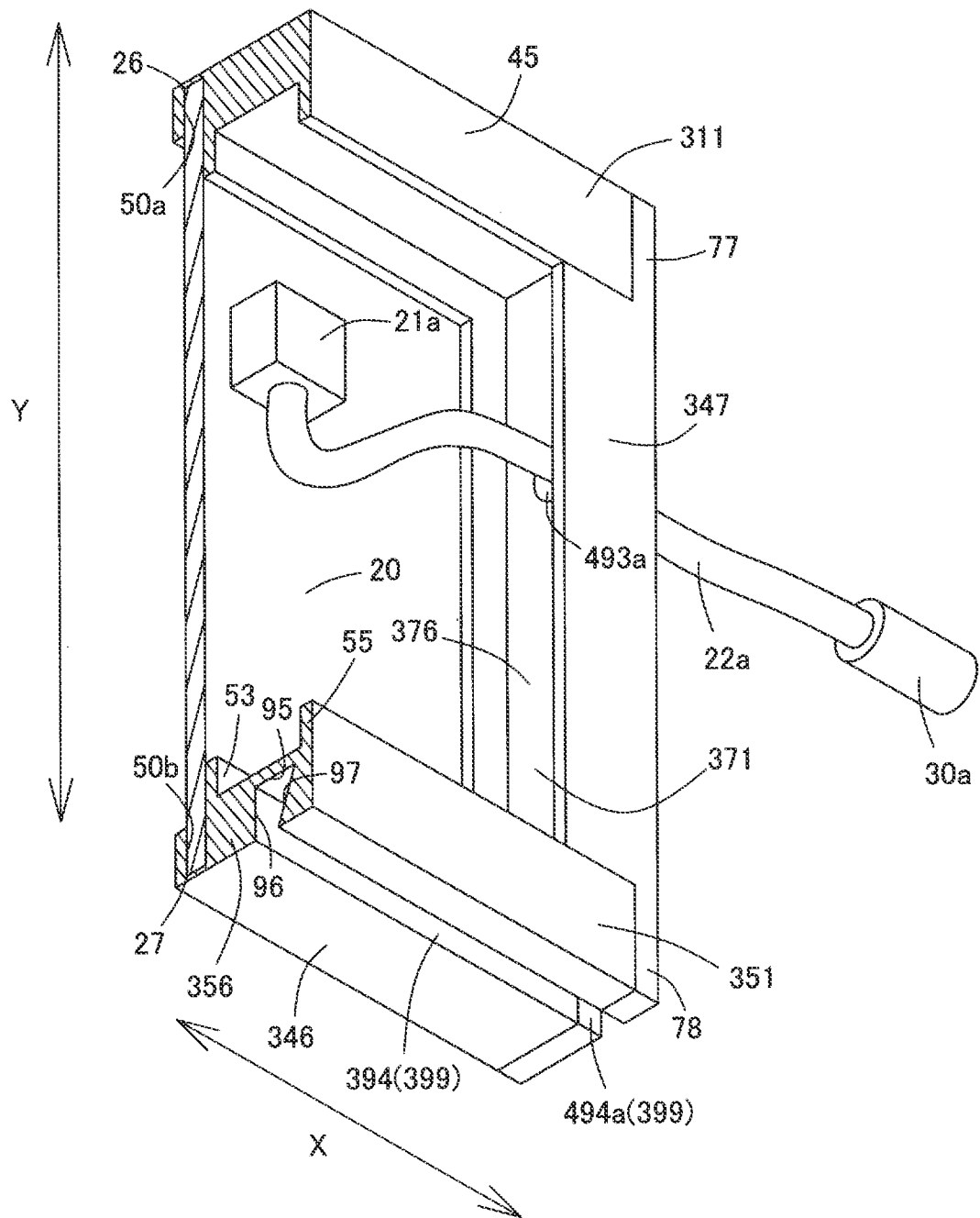
FIG. 17 is a vertical cross-sectional perspective view of the solar cell module of FIG. 16 as viewed from the lower side of the back.

As illustrated in FIG. 17, the lateral frame 346 is a reinforcing frame extending in the lateral direction X along a lower side 27, and also serves as a mounting part to be mounted to the support members 3.

The lateral frame 346 includes a holding recess 50 and a space keeping piece 351.

The space keeping piece 351 includes an opposing wall part 55 and a connection wall part 356.

The connection wall part 356 is a wall part that connects a rear side cover part 53 and an opposing wall part 55, and includes a notch part 394 (mounting-side engagement part).

As illustrated in FIG. 17, the notch part 394 is a notch provided at a lower end part of the connection wall part 356 in the vertical direction, and is an engagement part engageable with the locking parts 132 of the support members 3.

The notch part 394 is a notched groove provided over the entire connection wall part 356 in the longitudinal direction.

The notch part 394 has a width in the thickness direction of the solar cell panel 10, has a length in the thickness direction of the connection wall part 356, and has a depth extending upward in the vertical direction.

Similarly to the notch part 94 of the first embodiment, the notch part 394 has a trapezoidal cross-sectional shape, and includes a bottom wall part 95, a first inner wall part 96, and a second inner wall part 97.

Figure 18:
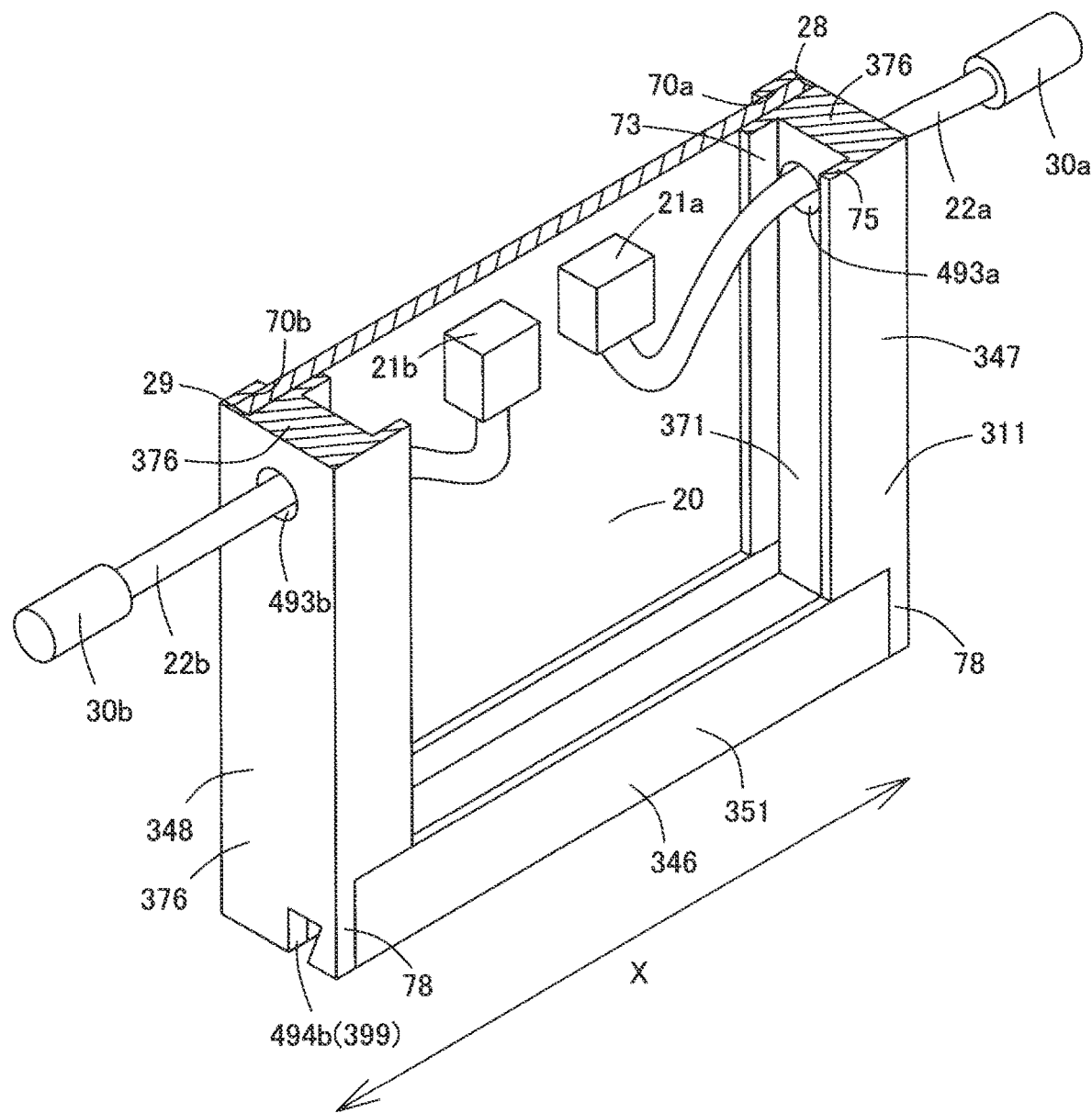
FIG. 18 is a lateral cross-sectional perspective view of the solar cell module of FIG. 16 as viewed from the upper side of the back.

As illustrated in FIG. 18, the longitudinal frames 347 and 348 are reinforcing frames extending in the longitudinal direction Y along the longitudinal sides 28 and 29, and also serve as mounting parts to be mounted to the support members 3.

As illustrated in FIGS. 17 and 18, the longitudinal frames 347 and 348 each include a holding recess 70, a space keeping piece 371, and coupling parts 77 and 78.

Each of the space keeping pieces 371 includes an opposing wall part 75 and a connection wall part 376.

Each of the connection wall parts 376 is a wall part that connects a rear side cover part 73 and an opposing wall part 75, and each include one of wiring holes 493a and 493b and one of notch parts 494a and 494b (mounting-side engagement part).

As illustrated in FIG. 18, the wiring holes 493a and 493b are through holes respectively provided at middle parts of the longitudinal frames 347 and 348 in the longitudinal direction and penetrating through the connection wall parts 376 and 376 in the thickness direction.

The wiring holes 493a and 493b respectively allow the connector portions 30a and 30b of the wiring portions 22a and 22b extending from the terminal boxes 21a and 21b to pass therethrough.

Each of the notch parts 494a and 494b is a notch provided at a lower end part, in the vertical direction, of one of the connection wall parts 376, and is an engagement part engageable with the locking parts 132 of the support members 3.

The notch parts 494a and 494b have a width in the thickness direction of the solar cell panel 10, have a length in the thickness direction of the connection wall parts 376, and have a depth extending upward in the vertical direction.

Similarly to the notch parts 94 of the first embodiment, each of the notch parts 494a and 494b has a trapezoidal cross-sectional shape, and includes a bottom wall part 95, a first inner wall part 96, and a second inner wall part 97.

Next, a description will be given on the positional relationship between the members of the solar cell module 302.

As illustrated in FIG. 16, the connection wall part 356 of the lateral frame 346 and the connection wall parts 376 and 376 of the longitudinal frames 347 and 348 form the same plane and form a bottom surface of the solar cell module 302.

Internal spaces of the notch part 394 of the lateral frame 346 and the notch parts 494a and 494b of the longitudinal frames 347 and 348 are continuous with each other so as to form a single engagement groove 399 (mounting-side engagement part). Specifically, when viewed from the side, the lateral frame 346 and the longitudinal frames 347 and 348 have overlapping parts between the notch part 394 and the notch parts 494a and 494b, and the engagement groove 399 extends across the connection wall part 356 of the lateral frame 346 and the connection wall parts 376 and 376 of the longitudinal frames 347 and 348. The engagement groove 399 has a continuous internal space in the extending direction and is open to the outside.

According to the installation structure 300 of the second embodiment, the holding recesses 50a, 50b, 70a, and 70b of the holding frame 40 and the support-side wall parts 91 and 91 of the mounting frames 41 and 42 of the first embodiment are configured with a single member (frame member 311); therefore, the number of parts can be reduced, and workability can be improved as compared with the conventional art.

According to the installation structure 300 of the second embodiment, the engagement groove 399 as a notched groove is provided across the lateral frame 346 and the longitudinal frames 347 and 348. Therefore, the solar cell module 2 can be moved in the extending direction of the engagement groove 399 by temporarily placing the solar cell module 2 in the middle of construction in a state where the locking parts 132 of the locking pieces 101 of the support members 3 is inserted in the engagement groove 399. As a result, alignment in the lateral direction X is easy.

Figure 19:
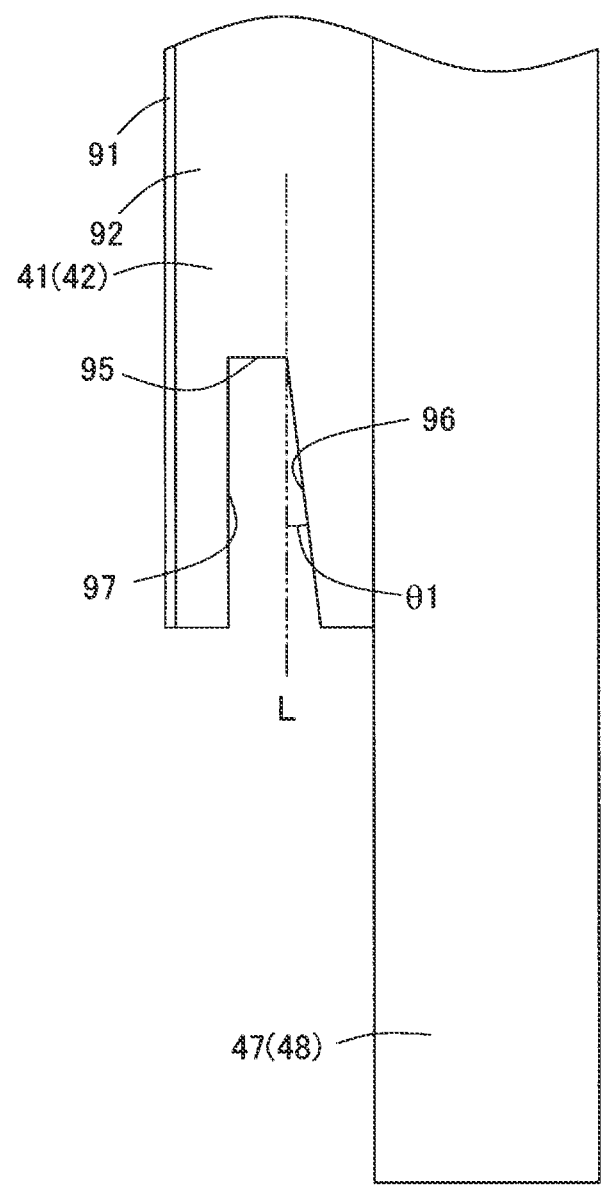
FIG. 19 is a side view of a main part of a solar cell module according to another embodiment of the present invention.

In the above-described embodiments, the inclined surfaces are provided on the second inner wall parts 97, but the present invention is not limited to this configuration. As illustrated in FIG. 19, the first inner wall part 96 may be provided with an inclined surface.

In the above-described embodiments, the inclined surfaces are provided on the entire surfaces of the second inner wall parts 97, but the present invention is not limited to this configuration. The inclined surface may be only partially formed on each of the second inner wall parts 97 or the first inner wall parts 96.

Figure 20:
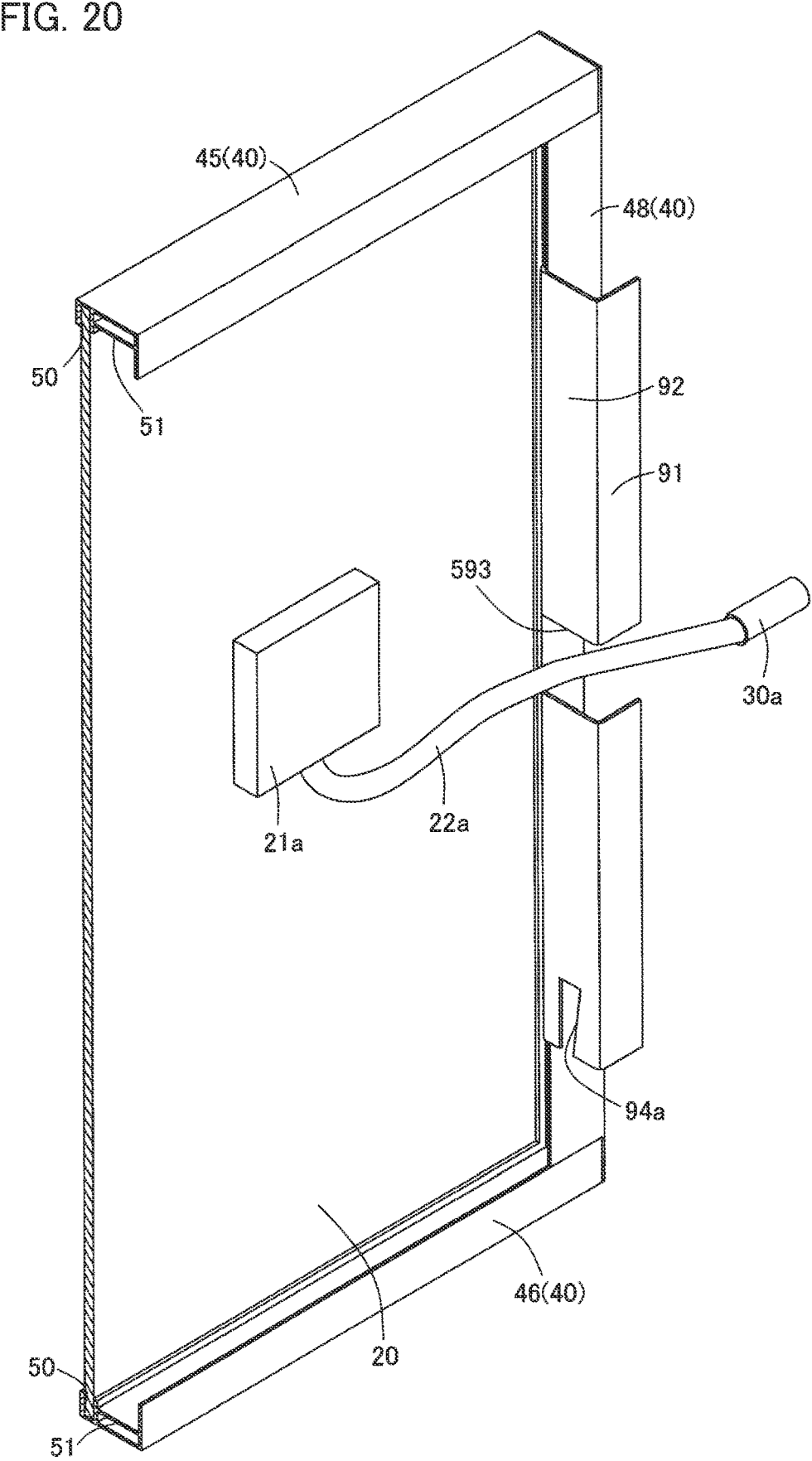
FIG. 20 is a cross-sectional perspective view of a main part of a solar cell module installation structure according to another embodiment of the present invention.

In the above-described embodiments, the wiring holes 93a and 93b penetrating through the second connection wall parts 92 and 92 in the thickness direction are provided, but the present invention is not limited to this configuration. As illustrated in FIG. 20, there may be provided a notch part 593 (penetration part) that extends from the back side to the second connection wall parts 92 and 92 and penetrates from the inside to the outside with reference to the terminal box 21 when the light receiving surface 23 is viewed from the front.

In the above-described embodiments, the two terminal boxes 21a and 21b are provided on the back surface 24 of the solar cell panel 10, but the present invention is not limited thereto. On the back surface 24 of the solar cell panel 10, there may be provided one terminal box 21 or may be provided with three or more terminal boxes 21.

In the above-described embodiments, the claw portions 140 and 141 of the engagement parts 102 sandwich the support-side wall parts 91 together with the support surfaces 129, thereby fixing the solar cell module 2, but the present invention is not limited to this configuration. The support-side wall parts 91 may be fixed to the solar cell module 2 by fastening elements.

In the above-described embodiments, the length, in the longitudinal direction Y, of the solar cell modules 2c and 2d located in the lower stage is longer than the length, in the longitudinal direction Y, of the solar cell modules 2a and 2b located in the upper stage, but the present invention is not limited to this configuration. The length, in the longitudinal direction Y, of the solar cell modules 2c and 2d located in the lower stage may be equal to or may be shorter than the length, in the longitudinal direction Y, of the solar cell modules 2a and 2b located in the upper stage.

In the above-described embodiments, the wiring holes 93a and 93b (493a and 493b) are provided in the central parts of the second connection wall parts 92 in the longitudinal direction Y. However, the present invention is not limited to this configuration, and the positions of the wiring holes 93a and 93b (493a and 493b) may be changed in accordance with the positions of the terminal boxes 21a and 21b. For example, when the terminal boxes 21a and 21b are off-centered toward an end side in the longitudinal direction Y, the positions of the wiring holes 93a and 93b (493a and 493b) may also be off-centered toward the end side in accordance with the positions of the terminal boxes 21a and 21b.

In the above-described embodiments, the wiring holes 93a and 93b (493a and 493b) are disposed at the positions corresponding to the terminal boxes 21a and 21b in the longitudinal direction Y, but the present invention is not limited to this configuration. The wiring holes 93a and 93b (493a and 493b) may be disposed at positions shifted from the terminal boxes 21a and 21b in the longitudinal direction Y.

In the above-described second embodiment, the wiring holes 493a and 493b are provided in the connection wall parts 376 and 376 of the longitudinal frames 347 and 348, but the present invention is not limited to this configuration. For example, in a case where the solar cell modules 2 and 2 adjacent to each other in the longitudinal direction Y are electrically connected to each other, the lateral frames 45 and 346 may be provided with the wiring holes 493a and 493b.

In the above-described embodiments, each component can be freely replaced or added between the embodiments as long as the replacement and the addition are included in the technical scope of the present invention.

EXPLANATION OF REFERENCE SIGNS 1, 300: installation structure
2, 302: solar cell module
2a: first solar cell module
2b: second solar cell module
3: support member
10: solar cell panel
11, 311: frame member
20: main body panel
21a, 21b: terminal box
22a, 22b: wiring portion (wiring parts)
24: back surface
40: holding frame
41, 42: mounting frame (mounting part)
70, 70a, 70b: holding recess
90: panel-side wall part
91: support-side wall part
92: second connection wall part
93, 93a, 93b, 493a, 493b: wiring hole (penetration part)
100a to 100c: rail part
132: locking part
200: wall surface
346: lateral frame (mounting part)
347, 348: longitudinal frame (mounting part)
593: notch part (penetration part)

The invention claimed is:

1. A solar cell module installation structure comprising:
a solar cell module; and
a support member that installs the solar cell module on a wall surface of a building,
wherein the support member includes a rail part extending substantially in a vertical direction,
the rail part having a vertical length longer than or equal to a vertical length of the solar cell module,
wherein the solar cell module includes: a solar cell panel; and a frame member,
the solar cell panel including: a main body panel; a terminal box provided on a back surface of the main body panel; and a wiring part extending from the terminal box,
the frame member including: a holding frame having a holding recess; and a mounting frame having a mounting part,
the holding recess sandwiching a part of the main body panel, thereby being in contact with a light receiving surface and the back surface of the main body panel,
wherein the mounting part is provided on a back surface side of the main body panel and is attached to the rail part,
wherein the mounting part includes a penetration part that passes through from an inside to an outside of the mounting part with reference to the terminal box when the light receiving surface is viewed from front,
wherein the wiring part passes through the penetration part and further passes between the holding frame and the rail part.

2. The solar cell module installation structure according to claim 1, wherein the penetration part is composed of a notch or a through hole.

3. The solar cell module installation structure according to claim 1,
wherein the support member includes a locking part,
wherein the mounting frame includes:
a panel-side wall part and a support-side wall part facing each other at an interval on the back surface of the main body panel; and
a connection wall part connecting the panel-side wall part and the support-side wall part,
wherein the support-side wall part is engaged with the locking part, and
wherein the penetration part is arranged on the connection wall part.

4. A solar cell module installation structure comprising:
a solar cell module; and
a support member that installs the solar cell module on a wall surface of a building, wherein the support member includes a rail part extending substantially in a vertical direction, the rail part having a vertical length longer than or equal to a vertical length of the solar cell module, wherein the solar cell module includes: a solar cell panel; and a frame member, the solar cell panel including: a main body panel; a terminal box provided on a back surface of the main body panel; and a wiring part extending from the terminal box, the frame member including: a holding recess; and a mounting part, the holding recess sandwiching a part of the main body panel, thereby being in contact with a light receiving surface and the back surface of the main body panel, wherein the mounting part is provided on a back surface side of the main body panel and is attached to the rail part, wherein the mounting part includes a penetration part that passes through from an inside to an outside of the mounting part with reference to the terminal box when the light receiving surface is viewed from front, wherein the wiring part passes through the penetration part, and wherein the holding recess and the mounting part of the frame member are composed of a single member.

5. A solar cell module installation structure comprising:

two solar cell modules provided side by side adjacent to each other; and a support member that installs the two solar cell modules on a wall surface of a building, wherein each of the two solar cell modules includes: a solar cell panel; and a frame member, the solar cell panel including: a main body panel; a terminal box provided on a back surface of the main body panel; and a wiring part extending from the terminal box, the frame member including: a holding frame having a holding recess; and a mounting frame having a mounting part, the holding recess sandwiching a part of the main body panel, thereby being in contact with a light receiving surface and the back surface of the main body panel, wherein the mounting part is provided on a back surface of the main body panel and is attached to the support member, wherein the mounting part includes a penetration part that passes through from an inside to an outside of the mounting part with reference to the terminal box when the light receiving surface is viewed from front, wherein the two solar cell modules include: a first and a second solar cell modules, wherein the wiring part of the first solar cell module passes through the penetration part of the first solar cell module, passes between the holding frame of the first solar cell module and the support member, and further passes through the penetration part of the second solar cell module, and wherein the wiring part of the first solar cell module is connected to the wiring part of the second solar cell module on the back surface of the main body panel of the second solar cell module.

6. The solar cell module installation structure according to claim 5, wherein the terminal box of the first solar cell module is off-centered toward a side of the second solar cell module in a direction in which the two solar cell modules are provided side by side, and wherein the terminal box of the second solar cell module is off-centered toward a side of the first solar cell module in the direction in which the two solar cell modules are provided side by side.

7. A house comprising:

a wall surface; and the solar cell module installation structure according to claim 1, wherein the solar cell module installation structure is installed on the wall surface.

8. A house comprising:

a wall surface; and the solar cell module installation structure according to claim 5, wherein the solar cell module installation structure is installed on the wall surface.

* * * * *